United States Patent
Ryoshi et al.

(10) Patent No.: US 11,973,223 B2
(45) Date of Patent: Apr. 30, 2024

(54) MANGANESE COMPOSITE HYDROXIDE AND PROCESS FOR PRODUCING SAME, POSITIVE ELECTRODE ACTIVE MATERIAL AND PROCESS FOR PRODUCING SAME, AND NON-AQUEOUS ELECTROLYTE SECONDARY BATTERY

(71) Applicant: SUMITOMO METAL MINING CO., LTD., Tokyo (JP)

(72) Inventors: Kazuomi Ryoshi, Ehime (JP); Kensaku Mori, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 925 days.

(21) Appl. No.: 16/996,959

(22) Filed: Aug. 19, 2020

(65) Prior Publication Data

US 2020/0381729 A1 Dec. 3, 2020

Related U.S. Application Data

(62) Division of application No. 15/322,250, filed as application No. PCT/JP2015/060456 on Apr. 2, 2015, now Pat. No. 10,840,511.

(30) Foreign Application Priority Data

Jun. 27, 2014 (JP) ................................ 2014-133398

(51) Int. Cl.
*H01M 4/525* (2010.01)
*C01G 53/00* (2006.01)
(Continued)

(52) U.S. Cl.
CPC .......... *H01M 4/525* (2013.01); *C01G 53/006* (2013.01); *C01G 53/50* (2013.01); *H01M 4/366* (2013.01);
(Continued)

(58) Field of Classification Search
CPC ...... H01M 4/525; H01M 4/505; H01M 4/366; C01G 53/006; C01G 53/50
See application file for complete search history.

(56) References Cited

U.S. PATENT DOCUMENTS

2013/0149608 A1 6/2013 Kim et al.
2014/0186710 A1 7/2014 Ryoshi et al.
(Continued)

FOREIGN PATENT DOCUMENTS

JP 2011-116580 A 6/2011
JP 2012-084502 A 4/2012
(Continued)

OTHER PUBLICATIONS

JP 2011116580—Translation.
Jun. 23, 2015 International Search Report issued in International Patent Application No. PCT/JP2015/060456.

*Primary Examiner* — Sarah A. Slifka
(74) *Attorney, Agent, or Firm* — Oliff PLC

(57) ABSTRACT

Provided is a precursor of a positive electrode active material for non-aqueous electrolyte secondary batteries which allows a non-aqueous electrolyte secondary battery to have excellent battery characteristics. A manganese composite hydroxide is obtained by adjusting the pH value of an aqueous solution for nucleation containing cobalt and/or manganese to 7.5 to 11.1 on the basis of a liquid temperature of 25° C. to form plate-shaped crystal nuclei, and adjusting the pH value of a slurry for particle growth containing the plate-shaped crystal nuclei to 10.5 to 12.5 on the basis of a liquid temperature of 25° C., and supplying a mixed aqueous solution including a metal compound containing at least manganese to the slurry, thereby performing particle growth of the plate-shaped crystal nuclei.

14 Claims, 4 Drawing Sheets

(51) Int. Cl.

|  |  |
|---|---|
| *H01M 4/02* | (2006.01) |
| *H01M 4/36* | (2006.01) |
| *H01M 4/505* | (2010.01) |
| *H01M 10/052* | (2010.01) |

(52) U.S. Cl.
CPC ......... *H01M 4/505* (2013.01); *C01P 2004/03* (2013.01); *C01P 2004/32* (2013.01); *C01P 2004/51* (2013.01); *C01P 2004/61* (2013.01); *C01P 2004/84* (2013.01); *C01P 2006/40* (2013.01); *H01M 2004/021* (2013.01); *H01M 2004/028* (2013.01); *H01M 10/052* (2013.01); *H01M 2220/30* (2013.01)

(56) References Cited

U.S. PATENT DOCUMENTS

| 2014/0377660 A1 | 12/2014 | Fukui et al. |
| 2015/0284259 A1 | 10/2015 | Kim et al. |
| 2017/0338485 A1 | 11/2017 | Toya et al. |

FOREIGN PATENT DOCUMENTS

| JP | 2013-120752 A | 6/2013 |
| JP | 2013-147416 A | 8/2013 |
| JP | 2014-129188 A | 7/2014 |
| WO | 2013/183711 A1 | 12/2013 |

MANGANESE COMPOSITE HYDROXIDE AND PROCESS FOR PRODUCING SAME, POSITIVE ELECTRODE ACTIVE MATERIAL AND PROCESS FOR PRODUCING SAME, AND NON-AQUEOUS ELECTROLYTE SECONDARY BATTERY

CROSS REFERENCE TO RELATED APPLICATION

This application is a divisional application of U.S. application Ser. No. 15/322,250, filed Dec. 27, 2016, the contents of which are incorporated herein by reference.

BACKGROUND OF THE INVENTION

Field of the Invention

The present invention relates to a manganese composite hydroxide and a process for producing the same, a positive electrode active material and a process for producing the same, and a non-aqueous electrolyte secondary battery. More specifically, the present invention relates to a manganese composite hydroxide serving as a precursor of a lithium-manganese composite oxide used as a positive electrode active material for non-aqueous electrolyte secondary batteries such as a lithium ion secondary battery and a process for producing the same, a positive electrode active material and a process for producing the same by making use of a manganese composite hydroxide serving as a precursor, and a non-aqueous electrolyte secondary battery including a positive electrode active material. The present application claims priority based on Japanese Patent Application No. 2014-133398 filed in Japan on Jun. 27, 2014.

Description of Related Art

In recent years, with the spread of portable electronic equipment, such as cell phones and notebook-sized personal computers, the development of a small and lightweight secondary battery having a high energy density has been strongly desired. Examples of such secondary battery include lithium ion secondary batteries in which, for example, lithium, a lithium alloy, a metal oxide, or carbon is used as a negative electrode, and such secondary batteries have been actively researched and developed.

A lithium ion secondary battery including a lithium metal composite oxide, particularly lithium-cobalt composite oxide, as a positive electrode active material yields a 4V class high voltage, and therefore, such secondary battery is expected to serve as a battery having a high energy density and the commercialization thereof is ongoing. For a battery including lithium-cobalt composite oxide, developments to achieve excellent initial capacity characteristics and cycle characteristics have been actively conducted, and various good results have been already obtained.

Examples of a positive electrode active material which has been mainly proposed until now include lithium-cobalt composite oxide ($LiCoO_2$), which can be relatively easily synthesized; lithium-nickel composite oxide ($LiNiO_2$), which includes nickel, a material less expensive than cobalt; lithium-nickel-cobalt-manganese composite oxide ($LiNi_{1/3}Co_{1/3}Mn_{1/3}O_2$); and lithium-manganese composite oxide ($LiMn_2O_4$), which includes manganese. For such a positive electrode active material, spherical or approximately spherical particles, which allow relatively easy synthesis, are used.

Examples of main characteristics of batteries including these positive electrode active materials include high capacity and high power density. In particular, for hybrid vehicle batteries, the demand for which is rapidly increasing in recent years, high power density is required.

To improve the power density of a battery, for example, an electrode film having a smaller thickness is employed for secondary batteries. For example, an electrode film having a thickness of approximately 50 μm is used for hybrid vehicle batteries. The reason why an electrode film having a smaller thickness can be used for hybrid vehicle batteries is that the migration length of lithium ions is smaller. Consequently, there is a risk that a positive electrode active material used for a thin electrode film may break through the electrode film, and therefore, such positive electrode active material is limited to particles small and uniform in size. For an electrode film for hybrid vehicle batteries, particles having a diameter of approximately 5 μm is used.

However, the use of such small particles for an electrode film has a disadvantage of causing a lower electrode density, and thereby causing a decrease in volume energy density, which is an important characteristic as well as power density.

Patent Document 1: JP 2012-84502 A

SUMMARY OF THE INVENTION

To break this trade-off relationship, for example, the shape of a positive electrode active material particle, which is typically spherical or approximately spherical, is changed, specifically changed into a plate shape. When a positive electrode active material particle has a plate shape, such a positive electrode active material particle has a larger surface area than the same-volume spherical particle, and furthermore, when the plate-shaped particles are oriented at the time of producing an electrode, a high electrode density can be achieved.

Furthermore, when such particles having a high aspect ratio are oriented, an electrode can be made still thinner, whereby still higher output power can be achieved.

As such a plate-shaped positive electrode active material particle, for example, Patent Literature 1 discloses a plate-shaped positive electrode active material particle, which has $t \leq 30$ and $d/t \geq 2$, where t is the thickness (m); d is the particle size, that is, a dimension in a direction perpendicular to the thickness direction defining the thickness t; and d/t is the aspect ratio, and in which primary crystal particles (lithium gateway plane oriented particles) oriented so that the (003) plane intersects with the plate plane of the plate-shaped particle are arranged to be dispersed in an aggregate of primary crystal particles (a large number of (003)-plane-oriented particles) oriented so that the (003) plane is in parallel to the plate plane of the plate-shaped particle.

However, even though the lithium gateway plane is oriented outside the secondary particles as described in Patent Literature 1, if the positive electrode active material does not satisfactorily come into contact with an electrolyte, output characteristics are adversely affected. Furthermore, Patent Literature 1 describes rate characteristics, but does not describe battery capacity, which is an important characteristic of batteries.

As described above, with the prior arts, it is difficult to industrially produce a positive electrode active material that allows the formation of a thin electrode film with high electrode density, has a high capacity, and has excellent output characteristics.

In view of these problems, an object of the present invention is to provide a positive electrode active material for non-aqueous electrolyte secondary batteries that allows the formation of a thin electrode film, the attainment of high output characteristics and high battery capacity when applied to a positive electrode of a battery, and the achievement of high electrode density, and a process for producing the positive electrode active material, and furthermore to provide a non-aqueous electrolyte secondary battery that includes this positive electrode active material, thereby achieving high capacity and high output.

Furthermore, an object of the present invention is to provide a manganese composite hydroxide that allows the provision of such positive electrode active material for non-aqueous electrolyte secondary batteries and serves as a precursor of the positive electrode active material, and to provide a process for producing the manganese composite hydroxide.

The present inventors earnestly made studies on a positive electrode active material for non-aqueous electrolyte secondary batteries that has a form allowing the achievement of high electrode density, and a manganese composite hydroxide serving as a precursor of the positive electrode active material. As a result, the inventors have made the findings that the control of the composition and crystallization conditions of the manganese composite hydroxide at the time of the crystallization thereof yields secondary particles in each of which spherical or clumped particles are two-dimensionally connected.

Furthermore, the inventors have made the findings that, when such manganese composite hydroxide is mixed with a lithium compound and the resultant mixture is fired, a positive electrode active material that inherits the form from the manganese composite hydroxide can be obtained, and both high output characteristics and battery capacity and high electrode density can be achieved, and accomplished the present invention.

That is, a manganese composite hydroxide according to the present invention to achieve the above-mentioned objects is represented by $Ni_xCo_yMn_zM_t(OH)_{2+A}$ (where x satisfies $0 \leq x \leq 0.5$; y satisfies $0 \leq y \leq 0.5$; z satisfies $0.35 < z < 0.8$; t satisfies $0 \leq t \leq 0.1$; A satisfies $0 \leq A \leq 0.5$; $x+y+z+t=1$; and M is at least one additive element selected from the group consisting of V, Mg, Al, Ti, Mo, Nb, Zr, and W), and characterized in that the manganese composite hydroxide includes secondary particles in each of which spherical or clumped manganese composite hydroxide particles each formed of an aggregate of a plurality of primary particles are two-dimensionally connected, the volume average particle size (Mv) measured by laser diffraction scattering is from 4 µm to 20 µm and the ratio (Mv/L) of the volume average particle size to the width (L) of the secondary particles in a direction perpendicular to a connecting direction of the manganese composite hydroxide particles is from 3 to 20.

A process for producing a manganese composite hydroxide according to the present invention, which manganese composite hydroxide is represented by $Ni_xCo_yMn_zM_t(OH)_{2+A}$ (where x satisfies $0 \leq x \leq 0.5$; y satisfies $0 \leq y \leq 0.5$; z satisfies $0.35 < z < 0.8$; t satisfies $0 \leq t \leq 0.1$; A satisfies $0 \leq A \leq 0.5$; $x+y+z+t=1$; and M is at least one additive element selected from the group consisting of V, Mg, Al, Ti, Mo, Nb, Zr, and W) comprises: a nucleation step of adjusting the pH value of an aqueous solution for nucleation including at least a metal compound containing cobalt and/or manganese to 7.5 to 11.1 on the basis of a liquid temperature of 25° C. to form plate-shaped crystal nuclei; and a particle growth step of adjusting the pH value of a slurry for particle growth containing the plate-shaped crystal nuclei formed in the nucleation step to 10.5 to 12.5 and to be higher than the pH value in the nucleation step on the basis of a liquid temperature of 25° C., and supplying a mixed aqueous solution containing a metal compound to the slurry for particle growth to perform the particle growth of the plate-shaped crystal nuclei until Mv/L becomes in a range of from 3 to 20.

A positive electrode active material for non-aqueous electrolyte secondary batteries according to the present invention is formed of a lithium transition metal composite oxide represented by $Li_{1+u}Ni_xCo_yMn_zM_tO_{2+\alpha}$ (where u satisfies $-0.05 \leq u < 0.60$, x satisfies $0 \leq x \leq 0.5$; y satisfies $0 \leq y \leq 0.5$; z satisfies $0.35 < z < 0.8$; t satisfies $0 \leq t \leq 0.1$; $x+y+z+t=1$; $0 \leq \alpha < 0.6$; and M is at least one additive element selected from the group consisting of V, Mg, Al, Ti, Mo, Nb, Zr, and W) and having a layer structure, and is characterized in that the positive electrode active material includes secondary particles in each of which spherical or clumped lithium transition metal composite oxide particles each formed of an aggregate of a plurality of primary particles are two-dimensionally connected; the volume average particle size (Mv) measured by laser diffraction scattering is from 4 µm to 20 µm; and the ratio (Mv/L) of the volume average particle size to the width (L) of the secondary particles in a direction perpendicular to a connecting direction of the lithium transition metal composite oxide particles is from 3 to 20.

A process for producing a positive electrode active material for non-aqueous electrolyte secondary batteries according to the present invention, which positive electrode active material includes a lithium transition metal composite oxide represented by $Li_{1+u}Ni_xCo_yMn_zM_tO_{2+\alpha}$ (where u satisfies $-0.05 \leq u < 0.60$, x satisfies $0 \leq x \leq 0.5$; y satisfies $0 \leq y \leq 0.5$; z satisfies $0.35 < z < 0.8$; t satisfies $0 \leq t \leq 0.1$; $x+y+z+t=1$; $0 \leq \alpha < 0.6$; and M is at least one additive element selected from the group consisting of V, Mg, Al, Ti, Mo, Nb, Zr, and W), comprises: a mixing step of mixing the above-mentioned manganese composite hydroxide with a lithium compound to produce a lithium mixture; and a firing step of firing the lithium mixture produced in the mixing step at a temperature of 650° C. to 1,000° C. in an oxidizing atmosphere.

A non-aqueous electrolyte secondary battery according to the present invention includes a positive electrode, a negative electrode, a non-aqueous electrolyte, and a separator, and is characterized in that the positive electrode contains the above-mentioned positive electrode active material.

The manganese composite hydroxide according to the present invention is suitable as a precursor of a positive electrode active material for non-aqueous electrolyte secondary batteries.

The positive electrode active material according to the present invention enables the attainment of high output characteristics and high battery capacity when used for a non-aqueous electrolyte secondary battery, and enables the achievement of high electrode density.

Furthermore, the non-aqueous electrolyte secondary battery according to the present invention includes such positive electrode active material, thereby achieving both high output characteristics and high battery capacity although the battery has a thin electrode film, and thus the battery has excellent characteristics.

DETAILED DESCRIPTION OF THE INVENTION

Figure 1:
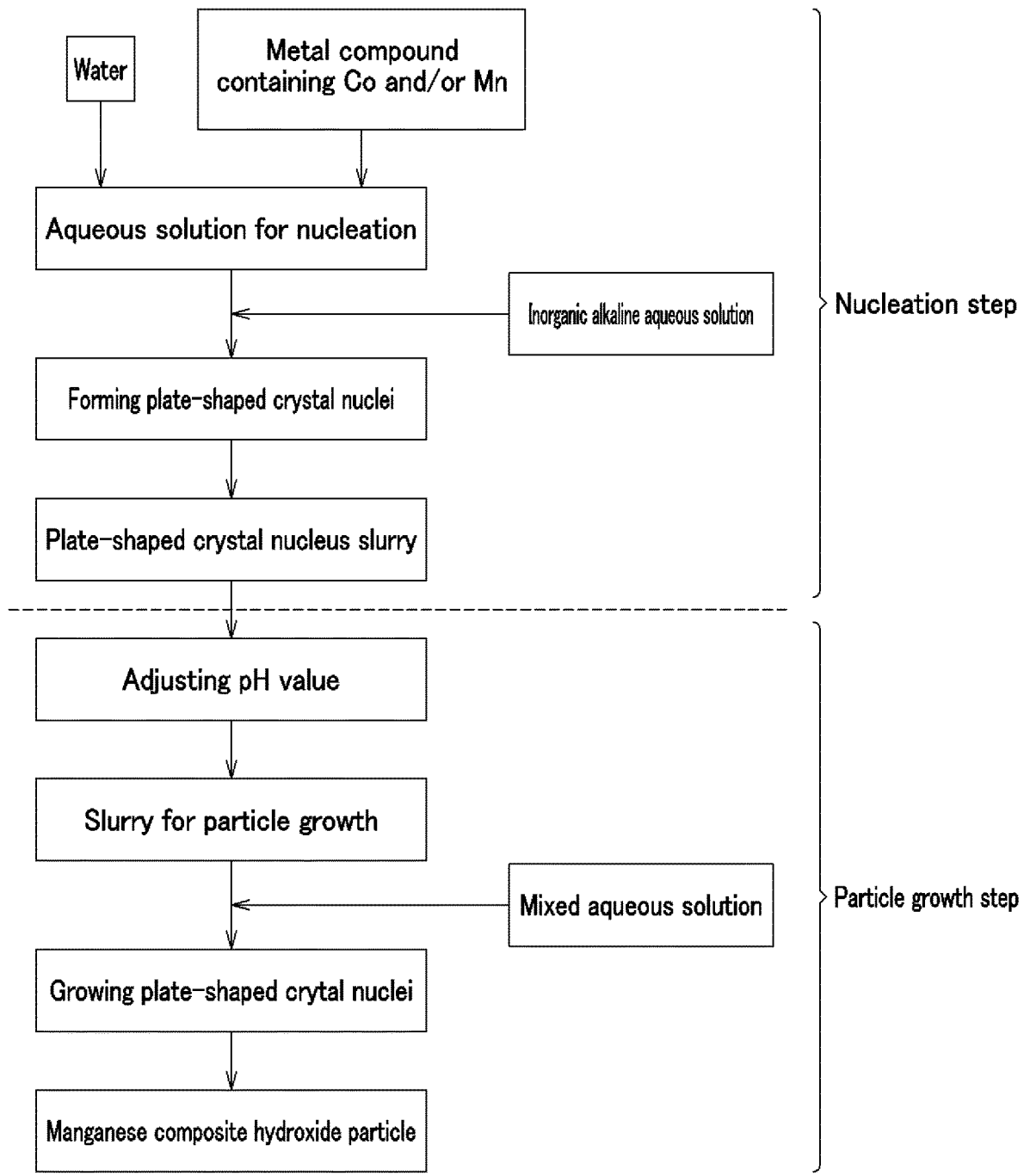
FIG. 1 is a flowchart illustrating a process for producing a manganese composite hydroxide according to the present invention.

Hereinafter, a specific embodiment suitable for the present invention (hereinafter, referred to as "the present embodiment") will be described in detail. It should be noted that the present invention is not limited to the following embodiment, and various changes may be suitably made within the scope not deviating from the gist of the present invention.

1. Manganese composite hydroxide and process for producing the same
2. Positive electrode active material for non-aqueous electrolyte secondary batteries and process for producing the same
3. Non-aqueous electrolyte secondary battery 1. Manganese Composite Hydroxide and Process for Producing the Same <1-1> Manganese Composite Hydroxide A manganese composite hydroxide according to the present embodiment is composed of secondary particles in each of which spherical or clumped manganese composite hydroxide particles (hereinafter, also referred to as "constituent particles") each formed of an aggregate of a plurality of primary particles are two-dimensionally connected. This manganese composite hydroxide has a volume average particle size (Mv) measured by laser diffraction scattering of 4 μm to 20 μm; and has a ratio (Mv/L) of the volume average particle size to the width (L) of the secondary particles in a direction perpendicular to a connecting direction of the constituent particles of from 3 to 20.

The inventors made studies on the packing density of the constituent particles in a positive electrode and the area of contact of the constituent particles with an electrolyte solution, and as a result, have made the findings that the use of the secondary particles in each of which spherical or clumped constituent particles are two-dimensionally connected allows both the improvement of the packing density and the achievement of a larger area of contact of the constituent particles with an electrolyte solution. In other words, the inventors have made the findings that, when use are made of the secondary particles in each of which spherical or clumped constituent particles are two-dimensionally connected, such small diameter particles bring the effect of increasing the area of contact of the particles with an electrolyte solution, and at the same time, such plate-shaped particles bring the effect of improving the packing density of particles.

(Particle form and structure)

It is important that the manganese composite hydroxide includes secondary particles in each of which constituent particles (manganese composite hydroxide particles) each formed of an aggregate of a plurality of primary particles are two-dimensionally connected. The form of positive electrode active material particles inherits the form of a manganese composite hydroxide serving as a precursor.

Therefore, here, when the form of precursor particles is controlled to be the form of the secondary particles in each of which constituent particles are two-dimensionally connected, the form of positive electrode active material particles obtained using these secondary particles can have the same features as those of the secondary particles. It should be noted that, when small-diameter or plate-shaped precursor particles are conventionally used, positive electrode active material particles inherit the form of the conventional precursor particles, and accordingly, a positive electrode active material according to the present embodiment cannot be obtained.

The manganese composite hydroxide has a volume average particle size (Mv) measured by laser diffraction scattering of 4 μm to 20 μm; and has a ratio (Mv/L) of the volume average particle size to the width (L) of the secondary particles in a direction perpendicular to a connecting direction of the constituent particles of from 3 to 20, preferably from 4 to 18. Furthermore, the manganese composite hydroxide preferably has a secondary particle width (L) of 1 μm to 5 μm.

When Mv, Mv/L, and L (hereinafter, referred to as "form-specifying values"), which specify the form of the manganese composite hydroxide, exceed their respective ranges, the form-specifying values of an obtained positive electrode active material could be out of their respective ranges, and accordingly, the effects of achieving the later-described high output characteristics and high battery capacity and thereby achieving high electrode density cannot be brought about. Therefore, the manganese composite hydroxide needs to have form-specifying values (Mv, Mv/L, L) within their respective ranges.

The width (L) of the secondary particles is determined in such a manner that the width (L) of each of the second particles is determined by observing the cross-sections of 3 or more of the spherical or clumped constituent particles connected to each other with a scanning electron microscope, measuring the maximum diameters of the particles in a direction perpendicular to a connecting direction thereof, and averaging the resultant values. Then, the widths of 20 or more of the secondary particles are averaged to determine the width (L) of the secondary particles.

In a manganese composite hydroxide, in the case where a plurality of primary particles aggregates to form a constituent particle, voids are uniformly present in the constituent particle. Accordingly, in the production of a positive electrode active material for non-aqueous electrolyte secondary batteries, when a manganese composite hydroxide and a lithium compound are mixed and fired, the molten lithium compound spreads into a constituent particle, and lithium is satisfactorily diffused, whereby a positive electrode active material for non-aqueous electrolyte secondary batteries with good crystallinity can be obtained. To obtain a positive electrode active material with more excellent crystallinity, the primary particles preferably aggregate in a random direction.

Furthermore, according to the process for producing the manganese composite hydroxide, the manganese composite hydroxide has a high concentration layer of cobalt and/or manganese extending in a connection direction of the secondary particles inside the secondary particles. The manganese composite hydroxide is formed by growing a plate-shaped crystal nucleus formed from a metal compound containing at least cobalt and/or manganese.

Accordingly, inside the formed manganese composite hydroxide, specifically, in the width-direction center of the manganese composite hydroxide, a high concentration layer of cobalt and/or manganese based on the plate-shaped crystal nucleus is present. When the plate-shaped crystal nucleus is developed to such an extent that such high concentration layer is formed, the secondary particle can be easily developed so as to have a desired form.

By contrast, in the case where no high concentration layer is present, such absence indicates the underdevelopment of the plate-shaped crystal nucleus, and thus, an obtained secondary particle sometimes does not have a desired form. However, in the case of a plate-shaped particle hard enough not to be destroyed during particle growth and having a form equivalent to that of a plate-shaped crystal nucleus, such plate-shaped particle can be used as a plate-shaped crystal nucleus to develop a secondary particle. Hence, in the case where plate-shaped particles having a desired composition and a desired form are prepared to obtain a manganese composite hydroxide, the manganese composite hydroxide has no high concentration layer.

To achieve a satisfactory secondary particle form, the high concentration layer is preferably 0.01 µm to 1 µm in thickness.

When the thickness of the high concentration layer is less than 0.01 µm, sometimes, the plate-shaped crystal nucleus is destroyed during nucleation or particle growth, whereby constituent particles are insufficiently connected in a two-dimensional direction. By contrast, when the thickness of the high concentration layer is more than 1 µm, sometimes the composition of an obtained positive electrode active material is inhomogeneous among particles, or the composition thereof is out of a predetermined range.

The growth of a crystal from a plate-shaped crystal nucleus is such that the development of particles on both surfaces of the plate-shaped crystal nucleus allows the formation of recesses in grain boundaries between the spherical or clumped particles in both the surfaces, and thus, the secondary particle has a high concentration layer in the center in the width direction thereof, namely, in a direction perpendicular to the connecting direction in the secondary particle. In other words, particles are preferably grown in a spherical or clumped form from the high concentration layer in the direction of both surfaces.

(Composition)

The manganese composite hydroxide has a composition represented by Formula (1): $Ni_xCo_yMn_zM_t(OH)_{2+A}$ (where x satisfies $0 \leq x \leq 0.5$; y satisfies $0 \leq y \leq 0.5$; z satisfies $0.35 < z < 0.8$; t satisfies $0 \leq t \leq 0.1$; A satisfies $0 \leq A \leq 0.5$; $x+y+z+t=1$; and M is at least one additive element selected from the group consisting of V, Mg, Al, Ti, Mo, Nb, Zr, and W).

When a positive electrode active material is obtained by using the above-described manganese composite hydroxide as a raw material, the obtained positive electrode active material inherits the composition ratio (Ni:Mn:Co:M) of this composite hydroxide. Therefore, the composition ratio of the manganese composite hydroxide is set so as to be the same as a composition ratio required for a target positive electrode active material. The composition represented by Formula (1) allows a battery to exhibit excellent performance when an obtained positive electrode active material for non-aqueous electrolyte secondary batteries is used for the battery.

(Particle Size Distribution)

The manganese composite hydroxide preferably has [(D90−D10)/Mv] of not more than 0.70. The [(D90−D10)/Mv] represents a variation index of particle size calculated by making use of D90 and D10 in a particle size distribution and a volume average particle size (Mv) each measured by laser diffraction scattering.

The particle size distribution of a positive electrode active material is strongly affected by a manganese composite hydroxide serving as a raw material, and therefore, when fine particles or coarse particles are mixed in a manganese composite hydroxide, it follows that the similar particles are present also in a positive electrode active material. In other words, when a manganese composite hydroxide has a variation index of more than 0.70 and thus has a wide particle size distribution, it follows that fine particles or coarse particles are sometimes present in a positive electrode active material.

In the case where a positive electrode is formed using a positive electrode active material in which many fine particles are present, there is a possibility of heat generation caused by a local reaction of the fine particles, whereby the safety of a battery is decreased and fine particles selectively deteriorate, and thus, the cycle characteristics of the battery are lowered. By contrast, in the case where a positive electrode is formed using a positive electrode active material in which many coarse particles are present, the reaction area between an electrolyte solution and the positive electrode active material cannot be sufficiently ensured, and accordingly reaction resistance increases, whereby battery output decreases.

Therefore, a variation index of a manganese composite hydroxide of not more than 0.70 allows the variation index of an obtained positive electrode active material to be smaller, thereby allowing the cycle characteristics and output characteristics to be improved. A small variation index allows the characteristics of a positive electrode active material to be improved, but it is difficult to perfectly control the variation in particle size, and hence, the practical lower limit of the variation index is approximately 0.30.

In [(D90−D10)/Mv], which is a variation index of particle size, D10 represents a particle size obtained at the point when the number of particles in every particle size is accumulated in the order from small to large particle size and the accumulated volume reaches 10% of a total volume of all the particles. D90 represents a particle size obtained at the point when the number of particles is accumulated in the same manner as mentioned above and the accumulated volume reaches 90% of a total volume of all the particles. The volume average particle size Mv and D90 and D10 can be measured using a laser diffraction scattering type particle size analyzer.

The above-described manganese composite hydroxide is characterized by including secondary particles in each of which spherical or clumped manganese composite hydroxide particles each formed of an aggregate of a plurality of primary particles are two-dimensionally connected; having a volume average particle size (Mv) measured by laser diffraction scattering of 4 µm to 20 µm; and having a ratio (Mv/L) of the volume average particle size to the width (L) of the secondary particles in a direction perpendicular to a connecting direction of the manganese composite hydroxide particles of from 3 to 20.

Such manganese composite hydroxide is suitable as a precursor of a positive electrode active material for non-aqueous electrolyte secondary batteries. In other words, the manganese composite hydroxide has the above-described characteristics, and therefore, the use of this manganese composite hydroxide as the precursor allows the contact area with an electrolyte solution to increase, and a positive electrode active material having high packing density to be achieved. Furthermore, the use of such characteristic manganese composite hydroxide allows the attainment of a positive electrode active material for non-aqueous electrolyte secondary batteries that achieves high output characteristics and high battery capacity although the electrode film is thin, and has high electrode density.

<1-2> Process for Producing Manganese Composite Hydroxide

In a process for producing a manganese composite hydroxide according to the present embodiment, a manganese composite hydroxide represented by Formula (1): $Ni_xCo_yMn_zM_t(OH)_{2+A}$ (where x satisfies $0 \leq x \leq 0.5$; y satisfies $0 \leq y \leq 0.5$; z satisfies $0.35 < z < 0.8$; t satisfies $0 \leq t \leq 0.1$; A satisfies $0 \leq A \leq 0.5$; $x+y+z+t=1$; and M is at least one additive element selected from the group consisting of V, Mg, Al, Ti, Mo, Nb, Zr, and W) is produced by a crystallization reaction.

<1-2-1> Nucleation Step and Particle Growth Step

As illustrated in FIG. 1, the process for producing the manganese composite hydroxide includes a nucleation step of forming plate-shaped crystal nuclei from an aqueous solution for nucleation containing at least a metal compound containing cobalt and/or manganese, and a particle growth step of growing the plate-shaped crystal nuclei formed in the nucleation step.

Here, according to conventional crystallization processes, a nucleation reaction and a particle growth reaction are allowed to simultaneously proceed in the same tank. Therefore, with the conventional crystallization processes, isotropically-grown composite hydroxide particles were obtained, and thus, it was difficult to control the form of the particles.

By contrast, the process for producing the manganese composite hydroxide is executed by clearly separating the nucleation step of mainly forming plate-shaped crystal nuclei by a nucleation reaction and the particle growth step of mainly growing particles on both surfaces of the plate-shaped crystal nuclei. Thus, the process for producing the manganese composite hydroxide allows the particle form of an obtained manganese composite hydroxide to be controlled.

Examples of a manner of separating the nucleation step and the particle growth step include, as later described, a manner of applying different pH values for each of the nucleation step and the particle growth step, and a manner of using different reaction vessels for each of the nucleation step and the particle growth step.

(Nucleation Step)

In the nucleation step, an aqueous solution for nucleation obtained by dissolving a metal compound containing cobalt and/or manganese into water at a predetermined ratio is mixed with an inorganic alkaline aqueous solution to adjust the pH value to 7.5 to 11.1 on the basis of a liquid temperature of 25° C., whereby plate-shaped crystal nuclei are formed. It should be noted that a metal compound containing nickel may be mixed in the aqueous solution for nucleation.

In the nucleation step, a metal compound containing cobalt and/or manganese is used, and the pH value of an aqueous solution for nucleation is adjusted whereby crystal nuclei made of a hydroxide of the metal compound containing cobalt and/or manganese are formed, which crystal nuclei have a plate shape.

Such a crystal nucleus is a portion corresponding to a high concentration layer of cobalt and/or manganese, that is, a layer containing cobalt and/or manganese in high concentrations, and metal elements other than cobalt and/or manganese may be contained in the crystal nucleus. In this case, the crystal nucleus is developed to have a plate shape, and therefore, the amount of cobalt and/or manganese contained in the crystal nucleus is preferably more than 80 atom %, more preferably not less than 90 atom % with respect to all metal elements in the crystal nucleus. To sufficiently develop the plate-shaped crystal nucleus, the crystal nucleus is preferably formed of only a metal compound hydroxide containing cobalt and/or manganese.

Specifically, in the nucleation step, first, at least a manganese-containing metal compound and/or a cobalt-containing metal compound, both detailed below, are dissolved in water so as to achieve a desired metal composition, whereby an aqueous solution for nucleation is prepared.

Next, an inorganic alkaline aqueous solution is added to the prepared aqueous solution for nucleation to adjust the pH value of the aqueous solution for nucleation to 7.5 to 11.1 on the basis of a liquid temperature of 25° C. The pH value of the aqueous solution for nucleation can be measured using a typical pH meter.

In the nucleation step, when the aqueous solution for nucleation has a desired composition and the pH value is adjusted to 7.5 to 11.1 on the basis of a liquid temperature of 25° C., a nucleus is developed in a plate shape to preferentially form a plate-shaped crystal nucleus. Thus, in the nucleation step, plate-shaped crystal nuclei of a composite hydroxide containing a metal compound of cobalt and/or manganese is formed in the aqueous solution for nucleation to obtain a plate-shaped crystal nuclei containing slurry (hereinafter, also referred to as "plate-shaped crystal nucleus slurry").

Figure 2:
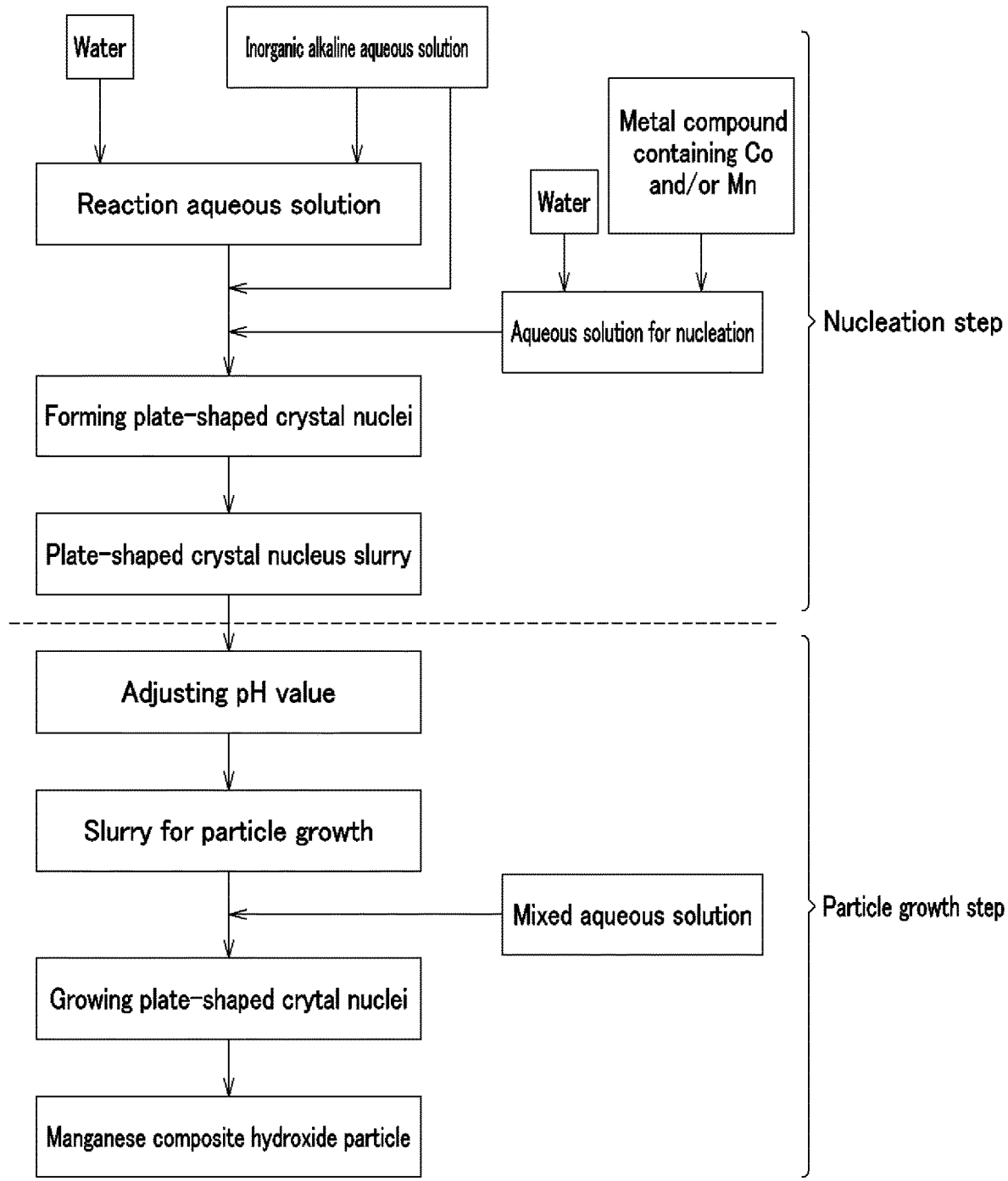
FIG. 2 is a flowchart illustrating a process for producing a manganese composite hydroxide according to the present invention, which process includes a different nucleation step from that of the production process illustrated in FIG. 1.

The nucleation step may be conducted without being limited to a process illustrated in FIG. 1, but by, for example, a process illustrated in FIG. 2. In the nucleation step illustrated in FIG. 1, an inorganic alkaline aqueous solution is directly added to the aqueous solution for nucleation to form plate-shaped crystal nuclei.

By contrast, in the nucleation step illustrated in FIG. 2, a reaction aqueous solution is prepared in advance by adding an inorganic alkaline aqueous solution to water to adjust the pH value to 7.5 to 11.1. Then, while the reaction aqueous solution is stirred in a reaction vessel, an aqueous solution for nucleation is supplied thereto, and while the pH value is maintained by adding an inorganic alkaline aqueous solution thereto, plate-shaped crystal nuclei are formed to obtain a plate-shaped crystal nucleus slurry. The process of supplying an aqueous solution for nucleation while maintaining the pH value of a reaction aqueous solution is preferable because such process enables the strict control of the pH value and the easy formation of plate-shaped crystal nuclei.

In the nucleation steps illustrated in FIG. 1 and FIG. 2, when a predetermined amount of crystal nuclei are formed in a plate-shaped crystal nucleus slurry from the aqueous solution for nucleation and the inorganic alkaline aqueous solution, the nucleation step is completed. Whether a predetermined amount of crystal nuclei is formed or not is judged by the amount of a metal salt added to the aqueous solution for nucleation.

The amount of crystal nuclei formed in the nucleation step is not limited to a particular amount, but, in order to obtain a manganese composite hydroxide having form-specifying values within their respective predetermined range, the amount of crystal nuclei is preferably 0.1% to 2%, more preferably 0.1% to 1.5% of the entire amount, that is, the amount of all metal salts supplied to obtain the manganese composite hydroxide.

(Particle Growth Step)

Next, the step proceeds to the particle growth step. In the particle growth step, after completion of the nucleation step, the pH value of the plate-shaped crystal nucleus slurry in the reaction vessel is adjusted to 10.5 to 12.5, preferably 11.0 to 12.0 on the basis of a liquid temperature of 25° C. and to be higher than the pH value in the nucleation step, whereby a slurry for particle growth in the particle growth step is obtained. Specifically, the pH value is controlled by adjusting the supply amount of an inorganic alkaline aqueous solution. It should be noted that the particle growth steps illustrated in FIG. 1 and FIG. 2 are performed in the same manner.

In the particle growth step, a mixed aqueous solution containing a metal compound is supplied to the slurry for particle growth. Besides a metal compound containing manganese, the mixed aqueous solution contains a metal compound containing nickel, a metal compound containing cobalt, or a metal compound containing an additive element as needed so as to obtain a manganese composite hydroxide having a predetermined composition ratio. In the particle growth step, the metal composition ratio of primary particles grown on both surfaces of the plate-shaped crystal nucleus is the same as the metal composition ratio of the mixed aqueous solution. On the other hand, also in the nucleation step, the metal composition ratio of the plate-shaped crystal nucleus is the same as the metal composition ratio of the aqueous solution for nucleation. Hence, the sum of a metal salt used in the nucleation step and a metal salt in the mixed aqueous solution used in the particle growth step is adjusted so as to be the composition ratio of metals of the manganese composite hydroxide.

In the particle growth step, when the pH value of the slurry for particle growth is adjusted to 10.5 to 12.0, preferably 11.0 to 12.0 on the basis of a liquid temperature of 25° C. and to be higher than the pH value in the nucleation step, the growth reaction of crystal nuclei overrides the nucleation reaction of crystal nuclei. Thus, in the particle growth step, new nuclei are scarcely formed in the slurry for particle growth, whereas the particle growth of plate-shaped crystal nuclei occurs.

In the particle growth step, the pH value is higher than the pH value in the nucleation step, and accordingly, in the presence of crystal nuclei, primary particles start to develop based on the crystal nuclei. Thus, the particle growth of primary particles occurs on the plate surfaces (both surfaces) of the plate-shaped crystal nucleus, thereby obtaining a manganese composite hydroxide grown to have a predetermined width (L) of the secondary particles each of which has a high concentration layer of cobalt and/or manganese in the center thereof and in each of which spherical or clumped constituent particles are two-dimensionally connected.

With the particle growth by the supply of the mixed aqueous solution, the pH value of the slurry for particle growth varies, and hence, an inorganic alkaline aqueous solution as well as the mixed aqueous solution is supplied to the slurry for particle growth so that the pH value of the slurry for particle growth is controlled to be maintained in a range of 10.5 to 12.5 on the basis of a liquid temperature of 25° C.

Then, at the point when the manganese composite hydroxide is grown to have a predetermined particle size Mv/L, the particle growth step is terminated. The particle size Mv/L of the manganese composite hydroxide is determined in such a manner that a preliminary test is conducted, and, based on the preliminary test, a relationship between the amount of metal salts added in both the nucleation step and the particle growth step and the resultant particles is found, whereby the particle size Mv/L is easily determined from the amount of metal salts added in both the steps.

As described above, according to the process for producing the manganese composite hydroxide, plate-shaped crystal nuclei are preferentially formed in the nucleation step, and subsequently, in the particle growth step, only the particle growth occurs on both surfaces of the plate-shaped crystal nuclei, in other words, in the direction of the width (L) of the formed secondary particles, whereas new crystal nuclei are scarcely formed. This allows the formation of homogeneous plate-shaped crystal nuclei in the nucleation step and allows the homogeneous particle growth of the plate-shaped crystal nuclei in the particle growth step. Thus, the process for producing the manganese composite hydroxide yields homogeneous manganese composite hydroxide particles having a narrow particle size distribution and a desired form.

Furthermore, according to the process for producing the manganese composite hydroxide, metal ions crystallize out as plate-shaped crystal nuclei or composite hydroxide particles in both the steps, and therefore, the ratio of liquid components to metal components in each of the slurries increases. In this case, the concentration of metal salts supplied seemingly decreases, and, particularly in the particle growth step, there is a risk that composite hydroxide particles insufficiently grow.

Therefore, after the completion of the nucleation step and midway during the particle growth step, some of liquid components in the slurry for particle growth are preferably discharged out of the reaction vessel in order to prevent the liquid components from increasing. Specifically, for example, the supply of an inorganic alkaline aqueous solution and a mixed aqueous solution to the slurry for particle growth and the stirring of the mixture are paused to cause the sedimentation of plate-shaped crystal nuclei and solids in the slurry for particle growth, and a supernatant liquid of the slurry for particle growth is discharged. This allows the relative concentration of the mixed aqueous solution in the slurry for particle growth to be increased.

Furthermore, a manganese composite hydroxide can be grown in a state in which the relative concentration of the mixed aqueous solution is high, and accordingly, the manganese composite hydroxide can have a narrower particle size distribution, and the density of the constituent particles in the whole of the secondary particle can be increased.

The particle growth steps illustrated in FIG. 1 and FIG. 2 have an advantage that the pH value of the plate-shaped crystal nucleus slurry obtained in the nucleation step is adjusted to obtain the slurry for particle growth and, subsequent to the nucleation step, the particle growth step is conducted, and thus, a shift to the particle growth step can be promptly conducted.

Furthermore, those particle growth steps have advantages that the shift from the nucleation step to the particle growth step can be performed just by adjusting the pH value of the plate-shaped crystal nucleus slurry, and the pH value can be easily adjusted just by the temporary stop of supply to the inorganic alkaline aqueous solution or by the addition of the same kind of inorganic acid as an acid constituting a metal compound, for example, in the case of sulfate, by the addition of sulfuric acid to the plate-shaped crystal nucleus slurry.

Figure 3:
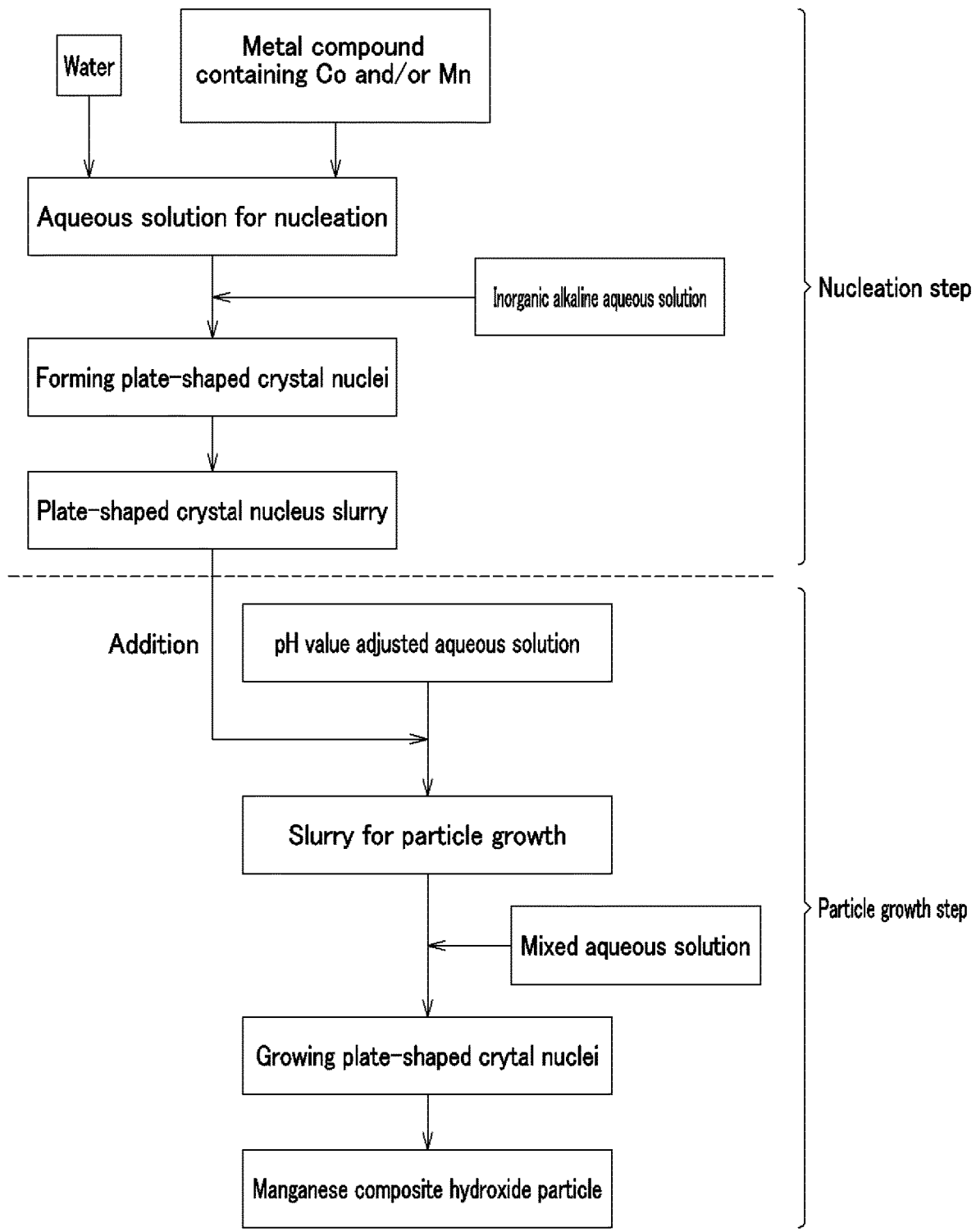
FIG. 3 is a flowchart illustrating a process for producing a manganese composite hydroxide according to the present invention, which process includes a different particle growth step from that of the production process illustrated in FIG. 1.

Here, the particle growth step is not limited to the processes illustrated in FIG. 1 and FIG. 2, and may be a process illustrated in FIG. 3. As is the case with the nucleation step illustrated in FIG. 1, a nucleation step illustrated in FIG. 3 allows plate-shaped crystal nuclei to be obtained by directly adding an inorganic alkaline aqueous solution to an aqueous solution for nucleation.

In the particle growth step illustrated in FIG. 3, separately from a plate-shaped crystal nucleus slurry, a pH-adjusted aqueous solution is prepared that has a pH value adjusted using an inorganic alkaline aqueous solution so as to be suitable for the particle growth step. Then, to this pH-adjusted aqueous solution, the plate-shaped crystal nucleus slurry formed through the nucleation step in another reaction vessel, or preferably what is obtained by removing some of liquid components from the plate-shaped crystal nucleus slurry as described above is added to prepare a slurry for particle growth. Using this slurry for particle growth, the particle growth step is conducted in the same manner as in the particle growth steps illustrated in FIG. 1 and FIG. 2.

In the process for producing the manganese composite hydroxide illustrated in FIG. 3, the separation of the nucleation step and the particle growth step can be further ensured, and accordingly, the state of a reaction aqueous solution in each of the steps can be made optimal for the step. In particular, from the starting point of the particle growth step, the pH value of the slurry for particle growth can be made optimal. A manganese composite hydroxide obtained having a narrower particle size distribution and being homogeneous can be obtained in the particle growth step.

<1-2-2> pH Control, Reaction Atmosphere, Particle Size, Mv/L Ratio, and Ammonia Concentration Next, the pH control, the reaction atmosphere, the particle size of a manganese composite hydroxide, the Mv/L ratio, and the ammonia concentration in each of the steps will be described in detail.

(pH Control in Nucleation Step)

In the nucleation steps illustrated in FIG. 1 to FIG. 3, the pH value of the aqueous solution for nucleation needs to be controlled to be in a range of 7.5 to 11.1 on the basis of a liquid temperature of 25° C.

When the pH value is less than 7.5 on the basis of a liquid temperature of 25° C., a metal compound remains in the solution, and a sufficient amount of plate-shaped crystal nuclei is not formed. By contrast, when the pH value is more than 11.1, the formation of spherical nuclei is superior to the formation of plate-shaped nuclei, and accordingly, plate-shaped crystal nuclei, which are suitable for attaining a manganese composite hydroxide, are insufficiently formed. In other words, in the nucleation step, when the pH value of the aqueous solution for nucleation is in a range of 7.5 to 11.1, plate-shaped crystal nuclei can be sufficiently formed.

(pH Control in Particle Growth Step)

In the particle growth step, the pH value of the slurry for particle growth needs to be controlled to be in a range of 10.5 to 12.5, preferably 11.0 to 12.0 on the basis of a liquid temperature of 25° C. and to be higher than the pH value in the nucleation step.

In the particle growth step, when the pH value is less than 10.5 on the basis of a liquid temperature of 25° C., more impurities such as more anion constituent elements contained in a metal salt are contained in an obtained manganese composite hydroxide. By contrast, in the particle growth step, when the pH value is more than 12.5 on the basis of a liquid temperature of 25° C., new spherical crystal nuclei are formed in the particle growth step, and thus, the proportion of plate-shaped particles to the spherical ones decreases and the particle size distribution becomes worse.

On the other hand, when the pH value is not more than the pH value in the nucleation step, plate-shaped crystal nuclei are newly formed, and accordingly, the particle size distribution becomes worse and plate-shaped crystal nuclei formed in the nucleation step insufficiently grow. That is, in the particle growth step, when the pH value of the slurry for particle growth is controlled to be in a range of 10.5 to 12.5 and higher than the pH value in the nucleation step, only plate-shaped crystal nuclei formed in the nucleation step are preferentially grown, and thus, the formation of new crystal nuclei can be inhibited, and a manganese composite hydroxide being homogeneous, having a narrower particle size distribution, and having a controlled form can be obtained.

In any of the nucleation step and the particle growth step, the range of pH variation is preferably within a set value plus or minus 0.2. When the range of pH variation is wide, crystal nuclei formation and particle growth are not kept constant, and, sometimes, homogeneous manganese composite hydroxide particles having a narrow particle size distribution cannot be obtained.

(Reaction Atmosphere in Nucleation Step)

In the nucleation step, the crystal nuclei are formed preferably in a non-oxidizing atmosphere of an oxygen concentration of not more than 5% by volume. This inhibits the above-described oxidation of manganese, nickel, and cobalt in the nucleation step, and allows the formation of a plate-shaped single crystal hydroxide to be accelerated so that plate-shaped crystal nuclei are developed in the nucleation step. The non-oxidizing atmosphere is defined by the oxygen concentration of an atmosphere in contact with an aqueous solution during the nucleation or the plate-shaped crystal nucleus slurry. An oxygen concentration of more than 5% by volume sometimes causes spherical or clumped nuclei each formed of an aggregate of fine crystals, and inhibits the formation of plate-shaped crystal nuclei. In order to sufficiently develop crystal nuclei so that the nuclei have a plate shape, the oxygen concentration is preferably not more than 2% by volume, more preferably not more than 1% by volume.

(Reaction Atmosphere in the Particle Growth Step)

Also in the particle growth step, an oxidizing atmosphere sometimes causes finer primary particles to grow on plate-shaped crystal nuclei, thereby preventing a closely-packed manganese composite hydroxide from being obtained. Therefore, the atmosphere in the particle growth step, in other words, the atmosphere in contact with the slurry for particle growth is preferably an atmosphere of an oxygen concentration of not more than 10% by volume, more preferably, as is the case with the nucleation step, an atmosphere of an oxygen concentration of not more than 2% by volume.

Examples of a means for maintaining the above-described reaction atmosphere in the interior space of a reaction vessel in each of the steps include the circulation of inert gas, such as nitrogen, into the interior space of the reaction vessel and the bubbling of inert gas in a reaction liquid.

(Control of Particle Size of Manganese Composite Hydroxide and Width of Secondary Particle)

The volume average particle size (Mv) of a formed manganese composite hydroxide is correlated with the size of plate-shaped crystal nuclei, and therefore the volume average particle size (Mv) can be controlled by adjusting, for example, the reaction atmosphere or stirring intensity in the nucleation step. Oxidation inhibition and weaker stirring allow plate-shaped crystal nuclei to be developed and the volume average particle size to be larger.

The width (L) of the secondary particles can be controlled by the duration of the particle growth step, and hence, when the particle growth step is continued until secondary particles grow to have the desired width, manganese composite hydroxide secondary particles having a desired width can be obtained. That is, the control of the volume average particle size in the nucleation step and the adjustment of the width of secondary particles in the particle growth step allow the Mv/L ratio to be controlled to 3 to 20.

(Ammonia Concentration)

To the slurry for particle growth in the particle growth step, ammonia is preferably added as a complexing agent. The concentration of ammonia in the slurry for particle growth in the particle growth step is preferably controlled to 5 g/L to 20 g/L. Also in the nucleation step, ammonia may be added in the same manner as in the particle growth step.

In the slurry for particle growth in the particle growth step, ammonia acts as a complexing agent, and hence, when the concentration of ammonia is less than 5 g/L, the solubility of metal ions cannot be kept constant, and accordingly, primary particles are heterogeneously developed on plate-shaped crystal nuclei, thereby sometimes causing variations in the width of the secondary particles. Furthermore, when the concentration of ammonia is less than 5 g/L, any plate-shaped crystal nucleus is not formed, whereas a fine gel nucleus is easily formed, and accordingly, the particle size distribution tends to be wider. This problem can be prevented by pH control, and more easily prevented by the addition of ammonia.

An ammonia concentration of more than 20 g/L causes too high solubility of metal ions and an increase in the amount of metal ions remaining in the slurry for particle growth, whereby, for example, composition deviation sometimes occurs.

Variations in the ammonia concentration cause variations in the solubility of metal ions, whereby a homogeneous manganese composite hydroxide is not formed. Hence, the concentration of ammonia is preferably kept constant. For example, the concentration of ammonia is preferably maintained at a desired concentration so that the ammonia concentration is allowed to vary within a range of a set concentration plus or minus approximately 5 g/L.

An ammonium ion supply source to be used is not limited to a particular one, and examples of the ammonium ion supply source include ammonia, ammonium sulfate, ammonium chloride, ammonium carbonate, and ammonium fluoride.

<1-2-3> Metal Compound to be Used, Reaction Conditions, and Others

Next, a metal compound (a metal salt) to be used and conditions such as reaction temperature will be described. The nucleation step and the particle growth step in the process for producing the manganese composite hydroxide differ only in ranges for controlling pH values and compositions of the aqueous solution for nucleation and the mixed aqueous solution, and thus, a metal compound to be used and conditions such as reaction temperature in both the steps are substantially the same.

(Metal Compound)

As the metal compound, a compound containing a target metal is used. As the compound, a water-soluble compound is preferably used, and examples of the compound include metal salts, such as nitrate, sulfate, and hydrochloride. For example, manganese sulfate, nickel sulfate, or cobalt sulfate is used.

(Additive Element)

As an additive element in Formula (1) (at least one additive element selected from the group consisting of V, Mg, Al, Ti, Mo, Nb, Zr, and W), a water-soluble compound is preferably used, and examples of the compound include vanadium sulfate, ammonium vanadate, magnesium sulfate, aluminum sulfate, titanium sulfate, peroxotitanic acid ammonium, potassium titanium oxalate, ammonium molybdate, niobium oxalate, zirconium sulfate, zirconium nitrate, sodium tungstate, and ammonium tungstate.

The addition of an additive element may be performed by adding an additive containing the additive element to the aqueous solution for nucleation or the mixed aqueous solution, whereby, in a state in which the additive element is uniformly dispersed in the composite hydroxide, coprecipitation can be achieved.

An additive element may be added by coating a surface of an obtained manganese composite hydroxide with a compound containing the additive element. It should be noted that, in the case where the surface is coated with an additive element, the atomic number ratio of additive element ions present at the time of the formation of a composite hydroxide by crystallization is beforehand reduced by the amount for the coating, whereby the atomic number ratio of metal in the manganese composite hydroxide can be coincided with a final composition ratio. Alternatively, the step of coating the surfaces of manganese composite hydroxide particles with an additive element may be applied to particles obtained after the heating of the composite hydroxide.

(Concentration of Mixed Aqueous Solution in Particle Growth Step)

The concentration of the mixed aqueous solution is 1.0 mol/L to 2.6 mol/L, preferably 1.5 mol/L to 2.2 mol/L in terms of the sum total of metal compounds.

A concentration of the mixed aqueous solution of less than 1.0 mol/L is not preferable because such concentration causes a decrease in the crystallization amount per reaction vessel, thereby causing a lower productivity. Furthermore, such concentration causes an increase in the ratio of liquid components to metal components in the slurry, thereby incurring the risk of the insufficient growth of composite hydroxide particles. By contrast, a concentration of the mixed aqueous solution of more than 2.6 mol/L exceeds a saturation concentration at room temperature, and accordingly, there is a risk that, for example, crystals re-precipitate, thereby causing a clogging of a pipe in equipment.

The mixed aqueous solution is not necessarily supplied to a reaction vessel as a mixed aqueous solution containing all metal compounds required for a reaction. For example, in the case where metal compounds that react with each other when mixed thereby to form a compound are used, metal compound solutions may be separately prepared so that the total concentration of all the metal compound solutions is 1.0 mol/L to 2.6 mol/L, and supplied to a reaction vessel at the same time at a predetermined ratio as aqueous solutions of the individual metal compounds.

(Reaction Aqueous Solution Temperature in Nucleation Step and Particle Growth Step)

In each of the steps, the liquid temperature of a reaction aqueous solution at the time of reaction is set to preferably not less than 20° C., more preferably 20° C. to 70° C. When the liquid temperature is less than 20° C., the solubility is low, whereby nucleation easily occurs and the control thereof is more difficult. Furthermore, in the particle growth step, new nucleation sometimes causes the formation of fine particles. By contrast, when the liquid temperature exceeds 70° C., in the case where ammonia is added, the volatilization of ammonia is accelerated, and therefore, to maintain a predetermined ammonia concentration, an excessive amount of an ammonium ion supply source needs to be added, thereby causing an increase in cost.

(Inorganic Alkaline Aqueous Solution in Nucleation Step and Particle Growth Step)

The inorganic alkaline aqueous solution for adjusting a pH value is not limited to a particular one, and examples of the inorganic alkaline aqueous solution include alkali metal hydroxide solutions, such as sodium hydroxide and potassium hydroxide. Such alkali metal hydroxide may be directly supplied, but, is preferably added in the form of an aqueous solution because of easiness of pH control at the time of crystallization.

Furthermore, a manner of adding an inorganic alkaline aqueous solution is not limited to a particular one, and it is only required that, while a reaction aqueous solution and the plate-shaped crystal nucleus slurry are sufficiently stirred, an inorganic alkaline aqueous solution is added using a pump capable of flow rate control, such as a metering pump, so as to keep the pH value in a predetermined range.

(Production Equipment)

In the process for producing the manganese composite hydroxide, use is made of an apparatus that does not collect a product until a reaction is completed. Examples of such apparatus include a common batch reaction tank equipped with a stirrer. When an apparatus that does not collect a product until a reaction is completed is employed, there does not arise a problem that particles under growth are collected simultaneously with an overflow liquid by, for example, a common continuous crystallizer to collect a product by overflow. Thus, particles having a narrow particle size distribution and being uniform in particle size can be obtained.

To control a reaction atmosphere, an apparatus capable of atmosphere control such as an enclosed type apparatus is preferably used. The use of such apparatus allows an obtained manganese composite hydroxide to easily have a form in which spherical or clumped manganese composite hydroxide particles are two-dimensionally connected to each other.

The above-described process for producing the manganese composite hydroxide includes: a nucleation step of adjusting the pH value of an aqueous solution for nucleation including at least a metal compound containing cobalt and/or manganese to 7.5 to 11.1 on the basis of a liquid temperature of 25° C. to form plate-shaped crystal nuclei; and a particle growth step of adjusting the pH value of a slurry for particle growth containing the plate-shaped crystal nuclei formed in the nucleation step to 10.5 to 12.5 and to be higher than the pH value in the nucleation step on the basis of a liquid temperature of 25° C., and supplying a mixed aqueous solution containing a metal compound to the slurry for particle growth to perform the particle growth of the plate-shaped crystal nuclei. This allows a manganese composite hydroxide having the above-mentioned characteristics to be obtained.

The process for producing the manganese composite hydroxide is of great industrial value in that the clear separation of the nucleation step and the particle growth step enables the achievement of the above-described characteristic manganese composite hydroxide, and the process can be easily conducted, has high productivity, and is suitable for industrial scale production.

2. Positive Electrode Active Material for Non-Aqueous Electrolyte Secondary Batteries and Process for Producing the Same <2-1> Positive Electrode Active Material for Non-Aqueous Electrolyte Secondary Batteries A positive electrode active material is obtained using a manganese composite hydroxide as a precursor. The positive electrode active material is formed of a lithium transition metal composite oxide represented by Formula (2): $Li_{1+u}Ni_xCo_yMn_zM_tO_{2+\alpha}$ (where u satisfies $-0.05 \leq u < 0.60$, x satisfies $0 \leq x \leq 0.5$; y satisfies $0 \leq y \leq 0.5$; z satisfies $0.35 < z < 0.8$; t satisfies $0 \leq t \leq 0.1$; $x+y+z+t \leq =1$; $0 \leq \alpha < 0.6$; and M is at least one additive element selected from the group consisting of V, Mg, Al, Ti, Mo, Nb, Zr, and W) and having a layer structure. This lithium transition metal composite oxide includes secondary particles in each of which spherical or clumped lithium transition metal composite oxide particles each formed of an aggregate of a plurality of primary particles are two-dimensionally connected. The positive electrode active material has a volume average particle size (Mv) measured by laser diffraction scattering of 4 μm to 20 μm, and has a ratio (Mv/L) of the volume average particle size to the width (L) of the secondary particles in a direction perpendicular to a connecting direction of the secondary particles of from 3 to 20.

(Composition)

In the positive electrode active material, u, which represents an excessive amount of lithium, is in a range of $-0.05 \leq u < 0.60$. When the excessive amount of lithium u is less than −0.05, in other words, when the lithium content is smaller than 0.95, a positive electrode of a non-aqueous electrolyte secondary battery including an obtained positive electrode active material is of higher reaction resistance, and accordingly, the output of the battery decreases.

By contrast, when the excessive amount of lithium u is not less than 0.60, in other words, when the lithium content is not less than 1.60, in the case of using a positive electrode active material for a positive electrode of a battery, the initial discharge capacity is lower and the positive electrode is of higher reaction resistance.

x, which represents the nickel content, is $0 \leq x \leq 0.50$. Nickel is an element contributing to the improvement of initial discharge capacity. When the value of x exceeds 0.50, the thermal stability is greatly reduced.

y, which represents the cobalt content, is $0 \leq y \leq 0.50$. Cobalt is an element contributing to the improvement of cycle characteristics. When the value of y exceeds 0.50, the initial discharge capacity is greatly reduced.

z, which represents the manganese content, is $0.35 < z < 0.8$. Manganese is an element contributing to the improvement of thermal stability and forming the later-described $Li_2Me'O_3$ to improve the initial discharge capacity. When the value of z is not less than 0.8, manganese dissolves into an electrolyte solution during the storage at high temperature or during the operation of a non-aqueous electrolyte secondary battery, and accordingly the characteristics are deteriorated.

As represented in Formula (2), the positive electrode active material is preferably adjusted so that a lithium transition metal composite oxide contains an additive element M. The thus-contained additive element M allows a battery including this additive element as the positive electrode active material to have improved durability and improved output characteristics. In particular, when the additive element M is uniformly distributed over the surfaces of particles or inside thereof, those effects can be achieved in the entirety of the particles, and, with the addition in small amounts, those effects can be achieved and a decrease in the capacity can be prevented.

An atomic ratio t of the additive element M to all the atoms of more than 0.1 is not preferable because such atomic ratio causes a decrease in metal elements that contribute to a Redox reaction, thereby causing a decrease in battery capacity. Therefore, the atomic ratio of the additive element M is adjusted so as to be in a range of $0 \leq t \leq 0.1$.

(Particle Form and Structure)

As a precursor of the positive electrode active material, use is made of a manganese composite hydroxide including secondary particles in each of which spherical or clumped manganese composite hydroxide particles (hereinafter, also referred to as constituent particles) each formed of an aggregate of a plurality of primary particles are two-dimensionally connected. Accordingly, like the manganese composite hydroxide, the positive electrode active material includes secondary particles in each of which spherical or clumped lithium transition metal composite oxide particles each formed of an aggregate of primary particles are two-dimensionally connected.

The positive electrode active material having such form has recesses in connection portions between spherical or clumped lithium transition metal composite oxide particles, and accordingly, has a larger specific surface area than that in the case of plate-shaped particles. Furthermore, each of spherical or clumped particles has a small particle size, and accordingly, lithium can be more easily intercalated and deintercalated, whereby the speed of the intercalation and deintercalation is higher.

Furthermore, such secondary particle is formed of constituent particles each formed of an aggregate of primary particles, and therefore lithium is intercalated into and deintercalated from gaps and grain boundaries present between the primary particles, and thus, the speed of the intercalation and deintercalation is further improved. These effects allow the achievement of output characteristics similar to those in the case of small diameter particles and higher than those in the case of plate-shaped particles.

Meanwhile, in each of the secondary particles, constituent particles are two-dimensionally connected to each other, and hence, when the particles are oriented and filled in at the time of producing an electrode, the gaps between the particles can be reduced as is the case where small diameter particles are filled in, high packing density can be achieved, and high volume energy density can be achieved. Furthermore, a thinner film electrode can be achieved.

Hence, the use of the positive electrode active material including the secondary particles having a form in which spherical or clumped lithium transition metal composite oxide particles each formed of an aggregate of primary particles are two-dimensionally connected allows both high output characteristics and battery capacity and high electrode density to be achieved.

The positive electrode active material has a volume average particle size (Mv) measured by laser diffraction scattering of 4 µm to 20 µm, and has a ratio (Mv/L, hereinafter, also referred to as an aspect ratio) of the volume average particle size to the width (L) of the secondary particles in a direction perpendicular to a connecting direction of the constituent particles of from 3 to 20, preferably from 4 to 18.

When Mv is less than 4 µm, even if the secondary particles have a form in which spherical or clumped lithium transition metal composite oxide particles are two-dimensionally connected to each other, the gaps between the secondary particles are increased at the time of the filling, and accordingly, the volume energy density decreases. Furthermore, when a slurry for electrode production is kneaded, the viscosity thereof is increased, thereby resulting in poor handling property. When Mv is more than 20 µm, lineation at the time of producing an electrode film and a short circuit due to separator penetration could be caused. Hence, when the volume average particle size (Mv) is adjusted to be in a range of 4 µm to 20 µm, a positive electrode active material that has high volume energy density in an electrode and prevents lineation at the time of producing an electrode film and a short circuit due to separator penetration can be achieved.

When the aspect ratio is less than 3, constituent particles have a larger particle size, thereby causing a smaller specific surface area and an insufficient contact with an electrolyte solution. Furthermore, the resistance to the dispersion of lithium into the inside of the particles is increased. Thus, an effect by the two-dimensionally connection form is not sufficiently exhibited, thereby causing lower output characteristics.

By contrast, when the aspect ratio is more than 20, the particle strength of secondary particles decreases, the particles are easily broken at the time of kneading a slurry for electrode production, an effect by the two-dimensionally connection form is not sufficiently achieved. Furthermore, the packing density into an electrode decreases, whereby the volume energy density decreases. The width (L) of the secondary particle can be determined in the same manner as for the manganese composite hydroxide.

Furthermore, the positive electrode active material preferably has a width (L) of the secondary particle is 1 µm to 5 µm. When the width (L) of the secondary particle is less than 1 µm, the strength of the positive electrode active material decreases, and particles are sometimes easily broken at the time of kneading a slurry for electrode production, accordingly. When the width (L) of the secondary particle is more than 5 µm, the specific surface area decreases, and output characteristics are sometimes lowered.

In the secondary particles in each of which constituent particles are two-dimensionally connected, the two-dimensionally connected particles may overlap each other in a layer form, and furthermore, such overlapping may be present in part or in whole of the secondary particle, as long as the aspect ratio (Mv/L) and the width (L) are in their above-described respective ranges. The diameter of the constituent particles (the length in a direction perpendicular to the two-dimensional direction) is the same as the width (L) of the secondary particles, in the case of a single layer, and is smaller than the width (L) of the secondary particles in the case where the particles overlap each other in a layer form. Therefore, the diameter of the constituent particles is preferably 1 µm to 5 µm.

The secondary particles do not need to form a perfect plane, and the centers of constituent particles may be out of alignment with a plane. As long as constituent particles are two-dimensionally connected as a whole in the secondary particle, both high output characteristics and high battery capacity and high electrode density can be achieved.

The width (L) of the secondary particles can be measured in the same manner as for the manganese composite hydroxide. The diameter of the constituent particles can be determined by measuring the constituent particles in the same manner as for the width (L) of the secondary particles.

(Particle Size Distribution)

The positive electrode active material preferably has [(D90−D10)/Mv] of not more than 0.75, the [(D90−D10)/Mv] representing a variation index of particle size calculated using D90 and D10 in a particle size distribution and a volume average particle size (Mv) each measured by laser diffraction scattering.

A wide particle size distribution of the positive electrode active material suggests that many fine particles having a diameter far smaller than the average particle size and many coarse particles having a diameter far larger than the average particle size are present in the positive electrode active material. When a positive electrode is formed using a positive electrode active material in which many fine particles are present, there is a risk of heat generation caused by a local reaction of the fine particles, and accordingly, safety is decreased and the fine particles selectively deteriorate, and thus, cycle characteristics are lowered.

By contrast, when a positive electrode is formed using a positive electrode active material in which many coarse particles are present, the reaction area between an electrolyte solution and the positive electrode active material cannot be sufficiently ensured, and accordingly, reaction resistance increases, whereby battery output decreases. Therefore, a small variation index allows the characteristics of a positive electrode active material to be improved. However, it is difficult to perfectly control the variation in the particle size, and hence, the practical lower limit of the variation index in the present invention is approximately 0.30.

Hence, when the particle size distribution of the positive electrode active material is controlled so that [(D90−D10)/Mv], which is a variation index of particle size, is not more than 0.75, fine particles and coarse particles are present in smaller proportion. A battery in which such positive electrode active material is used for a positive electrode further is excellent in safety and has good cycle characteristics and battery output. It should be noted that the average particle size and D90 and D10 herein mean the same as those in the case of the composite hydroxide particles, and may be measured in the same manner.

In the positive electrode active material, the lithium transition metal composite oxide is preferably represented by $Li_{1+u}Ni_xCo_yMn_zM_tO_{2+\alpha}$ (where u satisfies $0.40 \leq u < 0.60$; $z-x \leq u$ when $z-x > 0.4$; $u \leq z$ when $z < 0.6$; x satisfies $0 \leq x \leq 0.5$; y satisfies $0 \leq y \leq 0.5$; z satisfies $0.5 \leq z < 0.8$; t satisfies $0 \leq t \leq 0.1$; $z-x < 0.6$; $x+y+z+t=1$; $0.4 \leq \alpha < 0.6$; and M is at least one additive element selected from the group consisting of V, Mg, Al, Ti, Mo, Nb, Zr, and W).

When the lithium transition metal composite oxide has the above-described composition, hexagonal $LiMeO_2$ and monoclinic $Li_2Me'O_3$, where Me and Me' are each a metal element (Ni, Co, Mn, M) other than Li, are formed, thereby yielding a still higher capacity. This is considered because such composition ratio allows monoclinic $Li_2Me'O_3$, particularly $Li_2MnO_3$, which contributes the achievement of high capacity, to be formed, and $LiMeO_2$, which is a layered compound causing charge and discharge reactions by the intercalation and deintercalation of Li, is present around the $Li_2Me'O_3$, whereby Li intercalation and deintercalation reactions are accelerated even in $Li_2Me'O_3$, in which, usually, Li intercalation and deintercalation reactions scarcely occur, and accordingly, the battery capacity increases.

Hence, it is considered that, in theoretical capacity, a higher proportion of $Li_2Me'O_3$ leads to a higher discharge capacity. However, when the proportion of $Li_2Me'O_3$ is too high, the amount of $LiMeO_2$ present around $Li_2Me'O_3$ is smaller, the effect of accelerating the intercalation and deintercalation of Li is reduced and inert $Li_2Me'O_3$ increases, whereby the battery capacity decreases. To enhance the accelerating effect, a state in which there are many contact interfaces between $Li_2Me'O_3$ and $LiMeO_2$ is advantageous, and accordingly, a structure in which $Li_2Me'O_3$ and $LiMeO_2$ are present in a minutely mixed manner is preferable.

Here, an increase in u, which represents an excessive amount of Li, causes an increase in the presence of $Li_2Me'O_3$, thereby causing an increase in battery capacity. Hence, u is preferably not less than 0.40. By contrast, when u is more than 0.60, sometimes, the activity extremely decreases and electricity cannot be obtained, resulting in a decrease in the initial discharge capacity of the positive electrode active material and an increase in the reaction resistance of a positive electrode.

When the excessive amount of Mn with respect to Ni, that is, "z−x" is more than 0.4, u needs to be not less than "z−x". When u is less than "z−x", the amount of $Li_2MnO_3$ formed is smaller, resulting in a decrease in battery capacity. When z, which represents the amount of Mn, is less than 0.6, if a Li excessive amount exceeds the amount of Mn, excessive Li which does not form $Li_2MnO_3$ with Mn increases, thereby resulting in a decrease in battery capacity.

At least one of Ni and Co is preferably contained in the lithium transition metal composite oxide. x, which represents the amount of Ni, satisfies $0 \leq x \leq 0.5$, and y, which represents the amount of Co, satisfies $0 \leq y \leq 0.5$. When any of x and y is more than 0.5, $Li_2Me'O_3$ is formed in smaller amounts, thereby resulting in a decrease in battery capacity. By contrast, when both x and y are 0, $LiMeO_2$ is not formed, thereby resulting in a decrease in battery capacity.

z, which represents the amount of Mn, is preferably $0.5 \leq z < 0.8$. When z is less than 0.5, sometimes, $Li_2MnO_3$ is insufficiently formed and unreacted Li is present, thereby resulting in a decrease in battery capacity. By contrast, when z is not less than 0.8, there is not enough Li to form $Li_2MnO_3$ and $LiMeO_2$, and accordingly, a spinel phase of $LiNi_{0.5}Mn_{1.5}O_4$ is formed, thereby resulting in a decrease in battery capacity. To prevent the formation of a spinel phase, "z−x" is preferably less than 0.6.

α in the formula is a numerical value representing the excessive amount of O (oxygen), and is preferably in the same numerical range as that of u in order to form $Li_2Me'O_3$ and $LiMeO_2$.

As described above, to obtain a higher capacity, the positive electrode active material preferably includes hexagonal $LiMeO_2$ and monoclinic $Li_2Me'O_3$.

In the positive electrode active material, the site occupancy of metal ions other than lithium of the 3a site is preferably not more than 3%, the site occupancy being obtained by Rietveld analysis of a peak corresponding to a hexagonal lithium transition metal composite oxide in X-ray diffraction analysis. When the site occupancy of the 3a site is in this range, cation mixing does not occur in a lithium-manganese composite oxide, and crystallinity is high, whereby battery characteristics, in particular, charge-and-discharge capacity and output characteristics are higher. When crystallinity is low, metal ions in the 3a site inhibits the movement of lithium ions, thereby resulting in a decrease in battery characteristics.

Furthermore, in the positive electrode active material, the orientation index of the (003) plane corresponding to the hexagonal lithium transition metal composite oxide in X-ray diffraction analysis is preferably 0.9 to 1.1. Such orientation index suggests that crystals are randomly oriented. The random orientation of crystals allows battery capacity and output characteristics, which are affected by lithium intercalation and deintercalation properties, as well as cycle characteristics and safety, which are affected by the durability of a layer structure, to be both attained. When the orientation index of the (003) plane is biased, all the characteristics required for a battery cannot be at a high level, and some of the battery characteristics are sometimes insufficient.

The above-described positive electrode active material is characterized by including secondary particles in each of which spherical or clumped lithium transition metal composite oxide particles each formed of an aggregate of a plurality of primary particles are two-dimensionally connected; having a volume average particle size (Mv) measured by laser diffraction scattering of 4 μm to 20 μm; and having a ratio (Mv/L) of the volume average particle size to the width (L) of the secondary particles in a direction perpendicular to a connecting direction of the lithium transition metal composite oxide particles of from 3 to 20.

In other words, the positive electrode active material is formed from the above-described characteristic manganese composite hydroxide and a lithium compound, and therefore, inherits the structure and characteristics of the manganese composite hydroxide.

Hence, such positive electrode active material has a larger contact area with an electrolyte solution, thereby having a higher packing density. Furthermore, such positive electrode active material allows a thin electrode film to be formed.

Furthermore, such positive electrode active material allows a thin electrode film to be formed, high output characteristics and high battery capacity to be attained, and a non-aqueous electrolyte secondary battery having high electrode density to be achieved.

<2-2> Process for Producing Positive Electrode Active Material for Non-Aqueous Electrolyte Secondary Batteries A process for producing the positive electrode active material includes at least a mixing step of mixing a lithium compound with a manganese composite hydroxide or manganese composite oxide particles obtained by roasting a manganese composite hydroxide in an oxidizing atmosphere, thereby forming a mixture; and a firing step of firing the mixture formed in the mixing step.

The process for producing the positive electrode active material is not limited to a particular production process as long as the positive electrode active material can be produced so as to have the form, structure, and composition of the secondary particles. However, the following process is preferably employed because the positive electrode active material can be more reliably produced. Hereinafter, each step will be explained.

(a) Heat Treatment Step

First, the manganese composite hydroxide prepared as described above is heat-treated, as necessary.

The heat treatment step is a step of heat-treating to the manganese composite hydroxide to a temperature of 300° C. to 750° C., whereby moisture contained in the composite hydroxide is removed. This heat treatment step enables the amount of moisture remaining in the particles until the firing step to be reduced to a certain amount. This can prevent variations in the proportion of the atomic number of metals and the atomic number of lithium in the produced positive electrode active material. Hence, in the case where the proportion of the atomic number of metals and the atomic number of lithium in the positive electrode active material is precisely controlled, this step may be skipped.

In the heat treatment step, it is only required to remove moisture to the extent of not causing variations in the proportion of the atomic number of metals and the atomic number of lithium in the positive electrode active material, and therefore, it is not necessary to convert all of the manganese composite hydroxides into manganese composite oxides. However, to achieve a narrower range of variation in the atomic number, all of the manganese composite hydroxides are preferably converted into manganese composite oxides at a heating temperature of not less than 500° C.

In the heat treatment step, when the heating temperature is less than 300° C., sometimes, excessive moisture in the manganese composite hydroxide cannot be removed, whereby the variations cannot be controlled. By contrast, when the heating temperature is more than 750° C., sometimes, the heat treatment causes particles to undergo sintering, thereby inhibiting the achievement of a manganese composite oxide having a uniform particle size. When metal components contained in the manganese composite hydroxide depending on heat treatment conditions are beforehand calculated by analysis and the ratio of the metal components to a lithium compound is determined, variation in the atomic number can be controlled. The atmosphere for the heat treatment is not limited to a particular one, and is only required to be a non-reducing atmosphere, but, the heat treatment is preferably performed in an oxidizing atmosphere, in particular, in an air flow because of its simplicity.

The heat treatment duration is not limited to a particular one, but, a heat treatment duration of less than 1 hour sometimes causes insufficient removal of excessive moisture in the manganese composite hydroxide particles, and hence, the duration is preferably at least 1 hour, more preferably 5 hours to 15 hours.

Equipment for the heat treatment is not limited to particular one, and is only required to be capable of heating manganese composite hydroxide particles in a non-reducing atmosphere, preferably an air flow. For example, an electric furnace that does not generate gas is suitably used.

(b) Mixing Step

The mixing step is such that a manganese composite oxide heat-treated in the heat treatment step (hereinafter, referred to as "heat-treated particles") or, in the case where the heat treatment step is skipped, a non-heat-treated manganese composite hydroxide is mixed with a lithium-containing material such as a lithium compound to obtain a lithium mixture.

Here, heat treated particles include not only the manganese composite hydroxide from which residual water is removed in the heat treatment step, but also the manganese composite oxide obtained by the conversion into oxide in the heat treatment step, or mixed particles of the manganese composite hydroxide and the manganese composite oxide.

The manganese composite hydroxide or the heat treated particles is mixed with a lithium compound so that the ratio (Li/ME) of the atomic number (Li) of lithium to the sum of the atomic number (ME) of metals other than lithium in the lithium mixture, namely, the sum of the atomic number (ME) of nickel, manganese, cobalt, and an additive element in the lithium mixture is from 0.95 to 1.60, preferably from 1 to 1.60, more preferably from 1 to 1.50. In other words, Li/ME does not change before and after the firing step, and hence, Li/ME in the mixing of this mixing step serves as Li/ME in the positive electrode active material, and therefore, the mixing is performed so that Li/ME in the lithium mixture is the same as Li/ME in a target positive electrode active material.

The lithium compound used for forming the lithium mixture is not limited to a particular one, but, for example, lithium hydroxide, lithium nitrate, lithium carbonate, or a mixture thereof is preferably used in terms of their easy availability. In particular, from the viewpoints of easy handling and quality stability, lithium hydroxide or lithium carbonate is more preferably used.

It should be noted that the lithium mixture is preferably sufficiently mixed before fired. When the mixing is insufficient, there is a risk that Li/ME varies from particle to particle, whereby a problem arises that, for example, sufficient battery characteristics cannot be obtained.

For the mixing, a common mixer, such as a shaker mixer, a Lodige mixer, a Julia mixer, or a V blender, may be used.

The mixing is only required to be such that the manganese composite hydroxide or the heat treated particles are sufficiently mixed with a lithium compound to the extent that the form of the heat treated particles is not destroyed (c) Firing Step The firing step is a step of firing the lithium mixture obtained in the mixing step to form a lithium transition metal composite oxide. When the lithium mixture is fired in the firing step, lithium in a lithium compound diffuses into the manganese composite hydroxide or heat treated particles to form a lithium transition metal composite oxide. Even in the case where a high concentration layer of cobalt and/or manganese is present in the manganese composite hydroxide, the high concentration layer disappears due to the diffusion, whereby a structural high concentration layer is almost not present.

(Firing Temperature)

The lithium mixture is fired at a temperature of 650° C. to 1000° C., preferably a temperature of 750° C. to 980° C.

A firing temperature of less than 650° C. causes insufficient diffusion of lithium into the manganese composite hydroxide or the heat treated particles, thereby causing excessive lithium and unreacted particles to remain and the crystal structure not to be well-balanced, whereby, on the occasion of the application to a battery, sufficient battery characteristics are not achieved. A firing temperature of more than 1000° C. incurs the risk of intense sintering between lithium transition metal composite oxide particles and the risk of abnormal particle growth, thereby incurring the risk that the particles after fired are too coarse to maintain the particle form of the secondary particles. In such positive electrode active material, the above-described effects brought by the form of the secondary particles is not sufficiently achieved.

It should be noted that, from the viewpoint of a uniform reaction of the manganese composite hydroxide or heat treated particles with a lithium compound, the temperature is preferably raised to a firing temperature at a temperature rise rate of 3° C./min to 10° C./min. Furthermore, when the temperature is held around the melting point of the lithium compound for 1 hour to 5 hours, the reaction is more uniformly performed.

(Firing Time)

Of a firing time, a holding time at a predetermined temperature is preferably at least 2 hours, more preferably 4 hours to 24 hours. A holding time of less than 2 hours sometimes causes insufficient formation of a lithium-manganese composite oxide.

Not particularly limited, but, in the case where the lithium mixture is placed in a sagger and fired, after completion of the holding time, the atmosphere is preferably cooled to 200° C. or lower at a temperature drop rate of 2° C./min to 10° C./min to prevent deterioration of the sagger.

(Pre-Firing)

In particular, in the case where lithium hydroxide or lithium carbonate is used as a lithium compound, before the firing thereof, pre-firing is performed while the temperature is held lower than the firing temperature and at 350° C. to 800° C., preferably 450° C. to 780° C. for approximately 1 hour to 10 hours, preferably 3 hours to 6 hours. In other words, pre-firing is performed preferably at a temperature of the reaction of lithium hydroxide or lithium carbonate with the manganese composite hydroxide or the heat treated particles. In this case, when the temperature is held around the reaction temperature of lithium hydroxide or lithium carbonate, lithium sufficiently diffuses into the manganese composite hydroxide or heat treated particles, whereby a uniform lithium transition metal composite oxide can be obtained.

(Firing Atmosphere)

The firing atmosphere is an oxidizing atmosphere, preferably an atmosphere having an oxygen concentration of 18% by volume to 100% by volume, more preferably a mixed atmosphere of oxygen and inert gas. That is, the firing is preferably performed in an air or an oxygen flow. An oxygen concentration of less than 18% by volume incurs the risk of forming a lithium transition metal composite oxide having insufficient crystallinity.

It should be noted that a furnace used for the firing is not limited to a particular one, and is required only to be capable of heating the lithium mixture in an air or an oxygen flow, but an electric furnace, which does not generate gas, is preferably used from the viewpoint that an atmosphere in the furnace is uniformly maintained, and any of a batch type furnace and a continuous type furnace may be used.

(Pulverization)

Aggregation or light sintering of the lithium transition metal composite oxide obtained by the firing is sometimes caused. In this case, the composite oxide may be pulverized, and thus, the lithium transition metal composite oxide, that is, the positive electrode active material can be obtained.

It should be noted that the pulverization means an operation to supply mechanical energy to an aggregate formed of a plurality of the secondary particles resulting from, for example, sintering necking between the secondary particles at the time of the firing, and thereby to separate the secondary particles without substantially destroying the secondary particles and loosen the aggregate.

The above-described process for producing the positive electrode active material has the mixing step of mixing the manganese composite hydroxide with a lithium compound to prepare a lithium mixture; and the firing step of firing the lithium mixture prepared in the mixing step at a temperature of 650° C. to 1000° C. in an oxidizing atmosphere, whereby the above-described characteristic positive electrode active material can be achieved.

The process for producing the positive electrode active material is of great industrial value because the process can be easily executed, has high productivity, and is suitable for industrial scale production.

3. Non-Aqueous Electrolyte Secondary Battery

The non-aqueous electrolyte secondary battery is a battery employing a positive electrode including the positive electrode active material. First, the structure of the non-aqueous electrolyte secondary battery will be described.

The non-aqueous electrolyte secondary battery (hereinafter, simply referred to as secondary battery) has a structure substantially equivalent to that of a typical non-aqueous electrolyte secondary battery, except that the above-described positive electrode active material is used as a material of a positive electrode, and therefore, the description of the secondary battery will be made briefly.

Examples of the secondary battery include cylinder type, square type, coin type, and button type secondary batteries. Specifically, a cylinder-type secondary battery has a structure including a case, a positive electrode, a negative electrode, a non-aqueous electrolyte solution, and a separator, in which the positive electrode, the negative electrode, the non-aqueous electrolyte solution, and the separator are accommodated in the case. More specifically, the positive electrode and the negative electrode are laminated via the separator to form an electrode body; the obtained electrode body is impregnated with the non-aqueous electrolyte solution; a connection between a positive electrode current collector of the positive electrode and a positive electrode terminal thereof leading to the exterior and a connection between a negative electrode current collector of the negative electrode and a negative electrode terminal thereof leading to the exterior are each established using, for example, a lead for current collecting; and these constituents are sealed in the case, whereby the secondary battery is formed.

It should be noted that the structure of the secondary battery to which the present invention can be applied is, of course, not limited to the above-described structure. Furthermore, as an external shape of the secondary battery, various shapes, such as a tube shape and a laminated shape, may be employed.

(Positive Electrode)

The positive electrode is a sheet-shaped member and formed by applying a positive electrode mixture paste containing the above-described positive electrode active material to a surface of a current collector made of, for example, aluminum foil, and drying the paste. The positive electrode obtained by applying the positive electrode mixture paste to the surface of the current collector and drying the paste is sometimes referred to as "electrode film".

It should be noted that the positive electrode undergoes a treatment suitable for a target battery. For example, there is performed a cutting treatment of cutting the positive electrode into a size suitable for a target battery, or a pressurizing compression treatment using, for example, a roll press to increase electrode density.

The positive electrode mixture paste is formed by adding a solvent to a positive electrode mixture and kneading the mixture. The positive electrode mixture is formed by mixing a powder-formed positive electrode active material for secondary batteries with an electric conductive material and a binding agent.

The electric conductive material is added for the purpose of providing suitable conductivity to an electrode. This electric conductive material is not limited to a particular one, and examples of the electric conductive material to be used include graphite (for example, natural graphite, artificial graphite, and expanded graphite), and a carbon black material, such as acetylene black and Ketchen black.

The binding agent plays a role of binding positive electrode active material particles together. The binding agent used for the positive electrode mixture is not limited to a particular one, and, examples of the binding agent to be used include polyvinylidene fluoride (PVDF), polytetrafluoroethylene (PTFE), fluororubber, ethylene propylene diene rubber, styrene butadiene, cellulose resin, and polyacrylic acid. It should be noted that, for example, activated carbon may be added to the positive electrode mixture. The addition of activated carbon or other materials like allows a positive electrode to have an increased electrical double-layer capacity.

The solvent plays a role of dissolving the binding agent to disperse the positive electrode active material, the electric conductive material, and the activated carbon or other materials into the binding agent. This solvent is not limited to a particular one, and examples of the solvent to be used include an organic solvent, such as N-methyl-2-pyrrolidone.

The mixing ratio of the components in the positive electrode mixture paste is not limited to a particular one. For example, when the solid content, except the solvent, of the positive electrode mixture is taken as 100 parts by mass, as is the case with a positive electrode of a typical non-aqueous electrolyte secondary battery, the positive electrode active material content may be 60 parts by mass to 95 parts by mass, the electric conductive material content may be 1 part by mass to 20 parts by mass, and the binding agent content may be 1 part by mass to 20 parts by mass.

(Negative Electrode)

The negative electrode is a sheet-shaped member formed by applying a negative electrode mixture paste to a surface of a current collector made of metal foil, such as copper, and drying the paste. This negative electrode differs from the positive electrode in, for example, components constituting the negative electrode mixture paste and the formulation thereof and a material of the current collector, but is formed in substantially the same manner as that for the positive electrode, and as is the case with the positive electrode, the treatments are given as necessary. The negative electrode mixture paste is formed by mixing a negative electrode active material with a binding agent to form a negative electrode mixture and adding an appropriate solvent to the negative electrode mixture to form a paste. Examples of the negative electrode active material to be employed include lithium-containing materials, such as metal lithium and a lithium alloy, and an occlusion material capable of occluding and releasing lithium ions.

The occlusion material is not limited to a particular one, and examples of the occlusion material include natural graphite, artificial graphite, an organic compound fired material such as phenol resin, and powder of a carbon substance such as coke. In the case where such occlusion material is employed as the negative electrode active material, as is the case with the positive electrode, a fluorine-containing resin, such as PVDF, may be used as the binding agent, and as the solvent to disperse the negative electrode active material into the binding agent, an organic solvent, such as N-methyl-2-pyrrolidone, may be used.

(Separator)

The separator is disposed so as to be sandwiched between the positive electrode and the negative electrode, and has a function of separating the positive electrode and the negative electrode and holding an electrolyte. As such separator, for example, a thin film made of polyethylene or polypropylene and having many minute pores may be used. It should be noted that the separator is not limited to a particular one as long as having the function as a separator.

(Non-Aqueous Electrolyte Solution)

The non-aqueous electrolyte solution is formed by dissolving a lithium salt as a supporting electrolyte in an organic solvent. As the organic solvent, use may be made of one or a mixture of two or more selected from cyclic carbonates, such as ethylene carbonate, propylene carbonate, butylene carbonate, and trifluoro propylene carbonate; chain carbonates, such as diethyl carbonate, dimethyl carbonate, ethylmethyl carbonate, and dipropyl carbonate; ether compounds, such as tetrahydrofuran, 2-methyltetrahydrofuran, and dimethoxyethane; sulfur compounds, such as ethylmethylsulfone and butanesultone; and phosphorus compounds, such as triethyl phosphate and trioctyl phosphate.

As the supporting electrolyte, $LiPF_6$, $LiBF_4$, $LiClO_4$, $LiAsF_6$, $LiN(CF_3SO_2)_2$, or a composite salt thereof may be used.

It should be noted that the non-aqueous electrolyte solution may contain a radical scavenger, a surfactant, a flame retardant, and other agents for the purpose of improving battery characteristics.

(Battery Characteristics of Non-Aqueous Electrolyte Secondary Battery)

The non-aqueous electrolyte secondary battery has a positive electrode including the positive electrode active material having the above-described characteristic structure and characteristics, and accordingly, the contact area of the positive electrode active material with the non-aqueous electrolyte solution is increased, and the packing density of the positive electrode active material is higher, and therefore, despite the small thickness of the electrode film, high output characteristics and high battery capacity can be attained, and high electrode density can be achieved. This allows the secondary battery to attain higher initial discharge capacity and lower positive electrode resistance and to achieve higher capacity and higher output. Furthermore, the secondary battery has higher volume energy density. Furthermore, compared with a battery including conventional positive electrode active materials formed of lithium transition metal oxide, the secondary battery has higher thermal stability and is more excellent in safety.

(Use of Non-Aqueous Electrolyte Secondary Battery)

The non-aqueous electrolyte secondary battery has excellent battery characteristics, and therefore is suitable for power sources of small portable electronic equipment (such as notebook-sized personal computers and cell phones) in which high capacity is always required.

Furthermore, the non-aqueous electrolyte secondary battery is suitable as a battery serving as a power source for motor driving in which high output is required. Generally, a larger size battery causes difficulties in securing safety, thereby absolutely requiring an expensive protection circuit. However, the non-aqueous electrolyte secondary battery has excellent safety, and therefore not only allows safety to be more easily secured, but also allows an expensive protection circuit to be simplified, thereby leading to low cost. Furthermore, since the non-aqueous electrolyte secondary battery allows miniaturization and high output thereof, and is therefore suitable as a power source for transport equipment having a limited loading space.

EXAMPLES

Hereinafter, the present invention will be described in more detail by Examples 1 to 4 and Comparative Examples 1 and 2, but, the present invention is not limited at all by these Examples.

"1. Measurement of volume average particle size and particle size distribution", "2. Particle appearance", "3. Metal component analysis", and "4. Production and evaluation of battery" in Examples 1 to 4 and Comparative Examples 1 and 2 were made as follows. It should be noted that, in Example 1 and Comparative Example 1, unless otherwise specified, samples of extra-pure reagents produced by Wako Pure Chemical Industries, Ltd. were used for producing a manganese composite hydroxide and a positive electrode active material and for producing a secondary battery.

1. Measurement of Volume Average Particle Size and Particle Size Distribution

The volume average particle size and the particle size distribution were evaluated by the results of measurements using a laser diffraction particle size distribution measuring apparatus (trade name Microtrac, manufactured by Nikkiso Co., Ltd.).

2. Particle Appearance

The appearance of particles was observed using a scanning electron microscope (SEM: trade name S-4700, manufactured by Hitachi High-Technologies Corp.). In the SEM observation, 20 particles were arbitrarily selected, and the aspect ratios thereof were measured and averaged.

3. Metal Component Analysis

After a sample was dissolved, metal components were identified by inductively coupled plasma (ICP) emission spectrometry.

4. Production and Evaluation of Battery (Battery for Evaluation)

Figure 5:
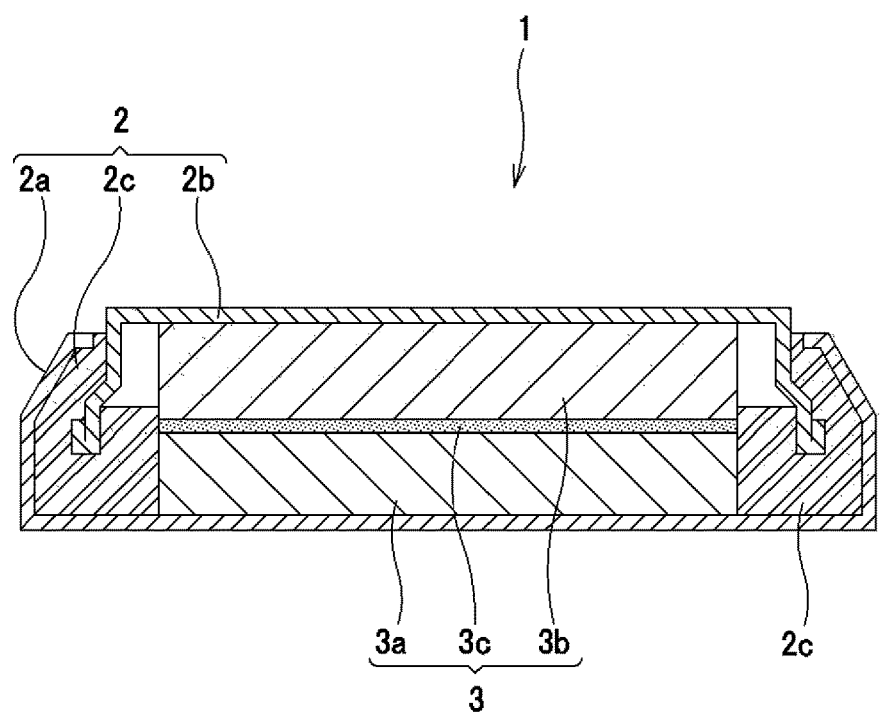
FIG. 5 is a schematic cross-sectional view of a coin type battery.

For a battery for evaluation, a 2032 type coin battery illustrated in FIG. 5 (hereinafter, referred to as a coin type battery 1) was used. As illustrated in FIG. 5, the coin type battery 1 is configured with a case 2 and an electrode 3 accommodated in the case 2.

The case 2 includes a positive electrode can 2a having a hollow and an opening at one end, and a negative electrode can 2b disposed in the opening of the positive electrode can 2a. The case 2 is configured such that, when the negative electrode can 2b is disposed in the opening of the positive electrode can 2a, a space to accommodate the electrode 3 is formed between the negative electrode can 2b and the positive electrode can 2a.

The electrode 3 includes a positive electrode 3a, a separator 3c, and a negative electrode 3b. The positive electrode 3a, the separator 3c, and the negative electrode 3b are laminated in this order. The electrode 3 is accommodated in the case 2 so that the positive electrode 3a comes into contact with an inner surface of the positive electrode can 2a, while the negative electrode 3b comes into contact with an inner surface of the negative electrode can 2b. It should be noted that the case 2 includes a gasket 2c, and this gasket 2c allows the relative movement of the positive electrode can 2a and the negative electrode can 2b to be fixed so as to keep a non-contact state between the positive electrode can 2a and the negative electrode can 2b. The gasket 2c also has a function of sealing a gap between the positive electrode can 2a and the negative electrode can 2b to airtightly and fluidtightly separate the interior of the case 2 and the exterior thereof.

(Production of Battery)

First, 52.5 mg of a positive electrode active material of Example 1 and Comparative Example 1, 15 mg of acetylene black, and 7.5 mg of polytetrafluoroethylene resin (PTFE) were mixed, and the mixture was press-formed at a pressure of 100 MPa so as to be 11 mm in diameter and 100 µm in thickness, whereby the positive electrode 3a was produced. The produced positive electrode 3a was dried in a vacuum dryer at 120° C. for 12 hours.

For the negative electrode 3b, use was made of a negative electrode sheet formed by applying graphite powder having an average particle size of approximately 20 µm and polyvinylidene fluoride to a copper foil and punched into a disk shape having a diameter of 14 mm. For the separator 3c, use was made of a porous polyethylene film having a film thickness of 25 For the electrolyte solution, use was made of an equal volume liquid mixture (manufactured by Tomiyama Pure Chemical Industries, Ltd.) of ethylene carbonate (EC) and diethyl carbonate (DEC), in which 1 M of $LiClO_4$ was used as a supporting electrolyte.

Using the positive electrode 3a, the negative electrode 3b, the separator 3c, and the electrolyte solution, the above-described coin type battery 1 was produced in a glove box with an Ar atmosphere in which a dew point was controlled to −80° C. The performance of the produced coin type battery 1 was evaluated based on the initial discharge capacity, the cycle capacity maintenance rate, and the rate characteristics thereof.

(Initial Discharge Capacity)

After produced, the coin type battery 1 was left to stand for 24 hours. Then, after an open circuit voltage (OCV) became stable, the battery was charged to 4.8 V of cut-off voltage while the current density for the positive electrode was set to 0.1 mA/cm$^2$, and then, after a 1-hour suspension, the battery was discharged to 2.5 V of cut-off voltage, and at this point, a discharge capacity was measured and determined as the initial discharge capacity.

(Cycle Capacity Maintenance Rate)

While the current density for the positive electrode of the coin type battery 1 was set to 2 mA/cm$^2$, a cycle of charge to 4.6 V and discharge to 3.0 V was repeated 200 times, and the ratio of a discharge capacity after the repetition of the charge and the discharge to the initial discharge capacity was calculated to determine the capacity maintenance rate. For the measurement of the charge and discharge capacity, a multi-channel voltage/current generator (R6741A, manufactured by ADVANTEST CORPORATION) was used.

(Rate Characteristics)

The rate characteristics were evaluated by the discharge capacity maintenance rate of the coin type battery 1 when the discharge rate was increased from 0.2 C to 5 C.

Example 1

(Nucleation Step)

In Example 1, 9.1 g of cobalt sulfate heptahydrate and 900 mL of pure water were fed into a crystallization reaction vessel equipped with four baffle plates and having a capacity of 5 L, and were heated to 60° C. by a thermostat bath and a heating jacket while stirred using a six-bladed inclined paddle at a rotation speed of 1000 rpm, whereby an aqueous solution for nucleation was obtained. Nitrogen gas was circulated through the reaction vessel to create a nitrogen gas atmosphere. At this time, the oxygen concentration in the interior space of the reaction vessel was 1.0%.

Next, to the aqueous solution for nucleation, a 25% by mass sodium hydroxide solution was supplied at 6.5 mL/min to increase the pH to 11.0 on the basis of a liquid temperature of 25° C., and then, the resultant solution was stirred for 1 hour to form plate-shaped crystal nuclei, whereby a plate-shaped crystal slurry was prepared.

(Particle Growth Step)

In Example 1, a composite solution of nickel sulfate (Ni molar concentration: 0.4 mol/L), cobalt sulfate (Co molar concentration: 0.2 mol/L), and manganese sulfate (Mn molar concentration 1.4 mol/L) was prepared as a mixed aqueous solution.

To the plate-shaped crystal nucleus slurry, 25% by mass ammonia water was added so that the ammonia concentration in the vessel was 10 g/L. Furthermore, sodium hydroxide was added to the plate-shaped crystal nucleus slurry to adjust the pH to 11.6 on the basis of a liquid temperature of 25° C., and then, the mixed aqueous solution was supplied thereto at 12.9 mL/min, and in addition, 25% by mass ammonia water was supplied thereto as a complexing agent at 1.5 mL/min while 25% by mass sodium hydroxide solution was intermittently supplied thereto. While the ammonia concentration and the pH on the basis of a liquid temperature of 25° C. were controlled to be kept constant at 10 g/L and 11.6, respectively, crystallization was continued for 2 hours to form a manganese composite hydroxide slurry. Thereafter, the resultant slurry was washed by water, filtered, and dried in an air atmosphere at 120° C. for 24 hours.

In Example 1, secondary particles of the obtained manganese composite hydroxide had a volume average particle size (MV) of 10.3 μm, [(D90–D10)/Mv] of 0.62, and an aspect ratio of 5.3. The composition was $Ni_{0.20}Co_{0.10}Mn_{0.70}(OH)_2$.

Figure 4:
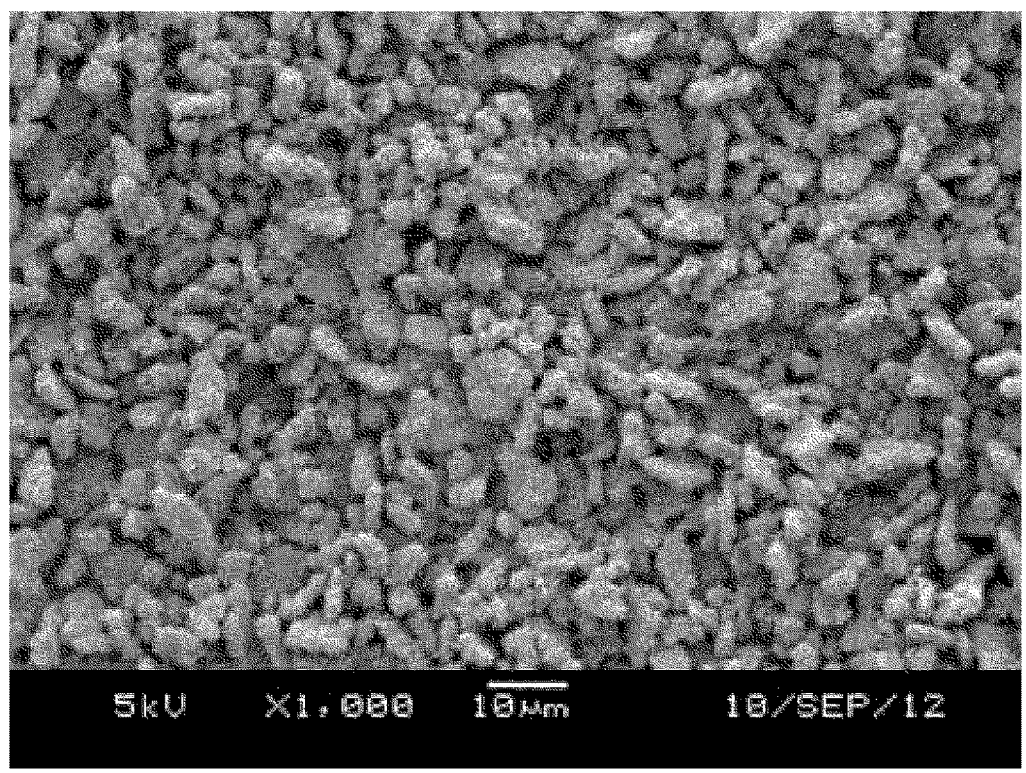
FIG. 4 is a scanning electron microscope photograph (at an observation magnification of 1,000×) of a manganese composite hydroxide obtained in Example 1.

In Example 1, when the cross sections of the obtained manganese composite hydroxide (secondary particles) were analyzed using an energy dispersive X-ray analyzer, it was confirmed that a high concentration layer of cobalt was formed in the width-direction center of each of the secondary particles, and the average thickness of the high concentration layers was 0.5 μm. FIG. 4 shows a scanning electron micrograph (magnification: 1,000×) of the secondary particles taken by a scanning electron microscope (trade name S-4700, manufactured by Hitachi High-Technologies Corp.). As shown in FIG. 4, observed were the secondary particles in which spherical or clumped manganese composite hydroxide particles are two-dimensionally connected.

(Production and Evaluation of Positive Electrode Active Material)

In Example 1, the obtained manganese composite hydroxide and lithium hydroxide weighed so as to achieve Li/ME=1.50 were mixed to form a lithium mixture. For the mixing, a shaker mixer (TURBULA Type T2C, manufactured by Willy A. Bachofen (WAB)) was used.

In Example 1, the obtained lithium mixture was fired in an air flow at 900° C. for 5 hours, and cooled, and then pulverized to obtain a positive electrode active material. It was confirmed by analysis using an X-ray diffractometer (X'Pert PRO, manufactured by PANalytical) that the obtained positive electrode active material included hexagonal $LiMeO_2$ and monoclinic $Li_2Me'O_3$.

In Example 1, the orientation index of the (003) plane determined by an X-ray diffracted waveform was 0.97, and the site occupancy of metal ions other than lithium of the 3a site determined by Rietveld analysis was 4.0%. Furthermore, a 2032 type coin battery was produced, and the initial discharge capacity, the cycle capacity maintenance rate, and the rate characteristics of the obtained positive electrode active material were evaluated.

Furthermore, in Example 1, the volume average particle size (MV), the aspect ratio, the composition ratio, the mixing rate of non-lithium ions into the 3a site, and the (003) plane orientation index were evaluated in the same manner as for the manganese composite hydroxide, and Table 1 shows the results. Table 2 shows the results of the battery evaluation. The [(D90–D10)/Mv] was equivalent to that of the manganese composite hydroxide. A Li-excessive type plate-shaped lithium composite oxide having a high aspect ratio was obtained, and the battery characteristics were confirmed to be excellent.

Example 2

In Example 2, a manganese composite hydroxide was obtained and evaluated in the same manner as in Example 1, except that a composite solution of nickel sulfate (Ni molar concentration: 0.8 mol/L), cobalt sulfate (Co molar concentration: 0.2 mol/L), and manganese sulfate (Mn molar concentration: 1.0 mol/L) was used as the mixed aqueous solution in the particle growth step.

In Example 2, secondary particles of the obtained manganese composite hydroxide had a volume average particle size (MV) of 11.2 μm, [(D90–D10)/Mv] of 0.65, and an aspect ratio of 4.4. The composition was $Ni_{0.40}Co_{0.10}Mn_{0.50}(OH)_2$.

In Example 2, it was confirmed that a high concentration layer of cobalt was formed in the width-direction center of each of the secondary particles of the obtained manganese composite hydroxide, and the average thickness of the high concentration layers was 0.4 The secondary particles had a structure in which spherical or clumped manganese composite hydroxide particles were two-dimensionally connected to each other.

Furthermore, in Example 2, a positive electrode active material was obtained and evaluated in the same manner as in Example 1. Table 1 and Table 2 show the evaluation results. The [(D90–D10)/Mv] was equivalent to that of the manganese composite hydroxide. A Li-excessive type plate-shaped lithium composite oxide having a high aspect ratio was obtained, and the battery characteristics were confirmed to be excellent.

Example 3

In Example 3, a manganese composite hydroxide was obtained and evaluated in the same manner as in Example 1, except that the oxygen concentration in the interior space of the reaction vessel was 3.0%.

In Example 3, secondary particles of the obtained manganese composite hydroxide had a volume average particle size (MV) of 9.4 μm, [(D90–D10)/Mv] of 0.60, and an aspect ratio of 3.4. The composition was $Ni_{0.20}Co_{0.10}Mn_{0.70}(OH)_2$.

In Example 3, it was confirmed that a high concentration layer of cobalt was formed in the width-direction center of each of the secondary particles of the obtained manganese composite hydroxide, and the average thickness of the high concentration layers was 0.6 The secondary particles had a structure in which spherical or clumped manganese composite hydroxide particles were two-dimensionally connected to each other.

Furthermore, in Example 3, a positive electrode active material was obtained and evaluated in the same manner as in Example 1. Table 1 and Table 2 show the evaluation results. The [(D90–D10)/Mv] was equivalent to that of the manganese composite hydroxide. A Li-excessive type plate-shaped lithium composite oxide having a high aspect ratio was obtained, and the battery characteristics were confirmed to be excellent.

Example 4

In Example 4, a manganese composite hydroxide was obtained and evaluated in the same manner as in Example 1, except that the crystallization in the particle growth step was 0.5 hour in duration.

In Example 4, secondary particles of the obtained manganese composite hydroxide had a volume average particle size (MV) of 10.0 μm, [(D90–D10)/Mv] of 0.58, and an aspect ratio of 15.4. The composition was $Ni_{0.20}Co_{0.10}Mn_{0.70}(OH)_2$.

In Example 4, it was confirmed that a high concentration layer of cobalt was formed in the width-direction center of each of the secondary particles of the obtained manganese composite hydroxide, and the average thickness of the high concentration layers was 0.4 The secondary particles had a structure in which spherical or clumped manganese composite hydroxide particles were two-dimensionally connected to each other.

Furthermore, in Example 4, a positive electrode active material was obtained and evaluated in the same manner as in Example 1. Table 1 and Table 2 show the evaluation results. Table 1 shows the volume average particle size (MV), the aspect ratio, the composition ratio, the mixing rate of non-lithium ions into the 3a site, and the (003) plane orientation index, and Table 2 shows the results of the battery evaluation.

The [(D90–D10)/Mv] was equivalent to that of the manganese composite hydroxide. A Li-excessive type plate-shaped lithium composite oxide having a high aspect ratio was obtained, and the battery characteristics were confirmed to be excellent.

Comparative Example 1

In Comparative Example 1, a manganese composite hydroxide was obtained and evaluated in the same manner as in Example 1, except that the pH in the nucleation step was increased to 11.3 on the basis of a liquid temperature of 25° C.

In Comparative Example 1, secondary particles of the obtained manganese composite hydroxide had a volume average particle size (MV) of 5.7 μm, [(D90–D10)/Mv] of 0.52, and an aspect ratio of 2.5. The composition was $Ni_{0.20}Co_{0.10}Mn_{0.70}(OH)_2$.

In Comparative Example 1, it was confirmed that a high concentration layer of cobalt was formed in the width-direction center of each of the secondary particles of the obtained manganese composite hydroxide, and the average thickness of the high concentration layers was 1.2 The secondary particles had a structure in which spherical or clumped manganese composite hydroxide particles were two-dimensionally connected to each other.

Furthermore, in Comparative Example 1, a positive electrode active material was obtained and evaluated in the same manner as in Example 1. Table 1 and Table 2 show the evaluation results. Table 1 shows the volume average particle size (MV), the aspect ratio, the composition ratio, the mixing rate of non-lithium ions into the 3a site, and the (003) plane orientation index, and Table 2 shows the results of the battery evaluation. The [(D90–D10)/Mv] was 0.72. A Li-excessive type plate-shaped lithium composite oxide having a low aspect ratio was obtained, and it was confirmed that the battery had a low discharge capacity and a low capacity maintenance rate.

Comparative Example 2

In Comparative Example 2, a manganese composite hydroxide was obtained and evaluated in the same manner as in Example 1, except that the crystallization in the particle growth step was 0.2 hour in duration.

In Comparative Example 2, secondary particles of the obtained manganese composite hydroxide had a volume average particle size (MV) of 9.7 μm, [(D90–D10)/Mv] of 0.61, and an aspect ratio of 22.3. The composition was $Ni_{0.20}Co_{0.10}Mn_{0.70}(OH)_2$.

In Comparative Example 2, it was confirmed that a high concentration layer of cobalt was formed in the width-direction center of each of the secondary particles of the obtained manganese composite hydroxide, and the average thickness of the high concentration layers was 0.4 The secondary particles had a structure in which spherical or clumped manganese composite hydroxide particles were two-dimensionally connected to each other.

Furthermore, in Comparative Example 2, a positive electrode active material was obtained and evaluated in the same manner as in Example 1. Table 1 and Table 2 show the evaluation results. Table 1 shows the volume average particle size (MV), the aspect ratio, the composition ratio, the mixing rate of non-lithium ions into the 3a site, and the (003) plane orientation index, and Table 2 shows the results of the battery evaluation. The [(D90–D10)/Mv] was 0.72. A Li-excessive type plate-shaped lithium composite oxide having a high aspect ratio was obtained, and it was confirmed that the battery had a low discharge capacity and a low capacity maintenance rate.

TABLE 1

| | Volume average particle size (μm) | Aspect ratio | Composition ratio | Mixing rate of non-lithium ions into 3a site (%) | (003) plane orientation index |
|---|---|---|---|---|---|
| Example 1 | 10.3 | 5.3 | $Li_{1.51}Ni_{0.20}Co_{0.10}Mn_{0.70}O_2$ | 4.0 | 0.97 |
| Example 2 | 11.2 | 4.4 | $Li_{1.51}Ni_{0.40}Co_{0.10}Mn_{0.50}O_2$ | 3.8 | 0.93 |
| Example 3 | 9.4 | 3.4 | $Li_{1.51}Ni_{0.20}Co_{0.10}Mn_{0.70}O_2$ | 3.7 | 0.97 |
| Example 4 | 10.0 | 15.4 | $Li_{1.51}Ni_{0.20}Co_{0.10}Mn_{0.70}O_2$ | 4.2 | 0.98 |
| Comparative Example 1 | 5.7 | 2.5 | $Li_{1.52}Ni_{0.20}Co_{0.10}Mn_{0.70}O_2$ | 4.8 | 1.01 |
| Comparative Example 2 | 9.7 | 22.3 | $Li_{1.51}Ni_{0.20}Co_{0.10}Mn_{0.70}O_2$ | 5.1 | 0.99 |

TABLE 2

| | Initial discharge capacity (mAh/g) | Discharge capacity for 5 C/discharge capacity for 0.2 C (%) | Capacity maintenance rate after 200 cycle (%) |
|---|---|---|---|
| Example 1 | 261 | 38.7 | 64 |
| Example 2 | 211 | 39.9 | 60 |
| Example 3 | 263 | 34.3 | 63 |
| Example 4 | 258 | 43.0 | 64 |
| Comparative Example 1 | 260 | 20.3 | 58 |
| Comparative Example 2 | 254 | 19.0 | 51 |

Glossary of Drawing References

1 . . . coin-type battery, 2 . . . case, 2a . . . positive electrode can, 2b . . . negative electrode can, 2c . . . gasket, 3 . . . electrode, 3a . . . positive electrode, 3b . . . negative electrode, 3c . . . separator

The invention claimed is:

1. A manganese composite hydroxide represented by $Ni_xCo_yMn_zM_t(OH)_{2+A}$ (where x satisfies 0≤x≤0.5; y satisfies 0≤y≤0.5; z satisfies 0.35<z<0.8; t satisfies 0≤t≤0.1; A satisfies 0≤A≤0.5; x+y+z+t=1; and M is at least one additive element selected from the group consisting of V, Mg, Al, Ti, Mo, Nb, Zr, and W),
wherein the manganese composite hydroxide comprises secondary particles in each of which spherical or clumped manganese composite hydroxide particles each formed of an aggregate of a plurality of primary particles are two-dimensionally connected, and
wherein a volume average particle size (Mv) measured by laser diffraction scattering is 4 μm to 20 μm; and a ratio (Mv/L) of the volume average particle size to a width (L) of the secondary particle in a direction perpendicular to a connecting direction of the manganese composite hydroxide particles is from 3 to 20.

2. The manganese composite hydroxide according to claim 1, wherein [(D90−D10)/Mv] is not more than 0.70, the [(D90−D10)/Mv] representing a variation index of particle size calculated using D90 and D10 in a particle size distribution measured by laser diffraction scattering and the volume average particle size (Mv).

3. The manganese composite hydroxide according to claim 1, wherein the secondary particle has a high concentration layer of cobalt and/or manganese in a width-direction center thereof.

4. The manganese composite hydroxide according to claim 3, wherein the high concentration layer has a thickness of 0.01 μm to 1 μm.

5. The manganese composite hydroxide according to claim 1, being a precursor of a positive electrode active material for non-aqueous electrolyte secondary batteries.

6. A process for producing a manganese composite hydroxide represented by $Ni_xCo_yMn_zM_t(OH)_{2+A}$ (where x satisfies 0≤x≤0.5; y satisfies 0≤y≤0.5; z satisfies 0.35<z<0.8; t satisfies 0≤t≤0.1; A satisfies 0≤A≤0.5; x+y+z+t=1; and M is at least one additive element selected from the group consisting of V, Mg, Al, Ti, Mo, Nb, Zr, and W), the process comprising:
a nucleation step of adjusting a pH value of an aqueous solution for nucleation including at least a metal compound containing cobalt and/or manganese to 7.5 to 11.1 on a basis of a liquid temperature of 25° C. to form plate-shaped crystal nuclei; and
a particle growth step of adjusting a pH value of a slurry for particle growth containing the plate-shaped crystal nuclei formed in the nucleation step to 10.5 to 12.5 and to be higher than the pH value in the nucleation step on a basis of a liquid temperature of 25° C., and supplying a mixed aqueous solution containing a metal compound to the slurry for particle growth to perform particle growth of the plate-shaped crystal nuclei until a ratio (Mv/L) of a volume average particle size (Mv) measured by laser diffraction scattering to a width (L) of the secondary particle in a direction perpendicular to a connecting direction of manganese composite hydroxide particles becomes in a range of from 3 to 20.

7. The process for producing the manganese composite hydroxide according to claim 6, wherein, in the nucleation step, the crystal nuclei are formed in a non-oxidizing atmosphere of an oxygen concentration of not more than 5% by volume.

8. The process for producing the manganese composite hydroxide according to claim 6, wherein, in the particle growth step, the slurry for particle growth has an ammonia concentration of 5 g/L to 20 g/L.

9. The process for producing the manganese composite hydroxide according to claim 6, wherein the slurry for particle growth is obtained by adjusting a pH value of a plate-shaped-crystal-nuclei-containing slurry containing the plate-shaped crystal nuclei obtained in the nucleation step.

10. The process for producing the manganese composite hydroxide according to claim 6, wherein the manganese composite hydroxide is a precursor of a positive electrode active material for non-aqueous electrolyte secondary batteries.

11. A process for producing a positive electrode active material for non-aqueous electrolyte secondary batteries, the positive electrode active material being formed of a lithium transition metal composite oxide represented by $Li_{1+u}Ni_xCo_yMn_zM_tO_{2+\alpha}$ (where u satisfies −0.05≤u<0.60, x satisfies $0 \leq x \leq 0.5$; y satisfies $0 \leq y \leq 0.5$; z satisfies $0.35 \leq z < 0.8$; t satisfies $0 \leq t \leq 0.1$; $x+y+z+t=1$; $0 \leq \alpha < 0.6$; and M is at least one additive element selected from the group consisting of V, Mg, Al, Ti, Mo, Nb, Zr, and W), the process comprising:
- a mixing step of mixing the manganese composite hydroxide according to claim 5 with a lithium compound to prepare a lithium mixture; and
- a firing step of firing the lithium mixture prepared in the mixing step at a temperature of 650° C. to 1,000° C. in an oxidizing atmosphere.

12. The process for producing the positive electrode active material for non-aqueous electrolyte secondary batteries according to claim 11, wherein a ratio (Li/ME) of the atomic number (Li) of lithium to the sum of the atomic number (ME) of metals other than lithium in the lithium mixture is from 0.95 to 1.60.

13. The process for producing the positive electrode active material for non-aqueous electrolyte secondary batteries according to claim 11, the process further comprising a heat treatment step of heat-treating the manganese composite hydroxide at a temperature of 300° C. to 750° C. in a non-reducing atmosphere before the mixing step.

14. The process for producing the positive electrode active material for non-aqueous electrolyte secondary batteries according to claim 11, wherein an oxidizing atmosphere in the firing step contains 18% by volume to 100% by volume of oxygen.

* * * * *